US007168953B1

(12) United States Patent
Poggio et al.

(10) Patent No.: US 7,168,953 B1
(45) Date of Patent: Jan. 30, 2007

(54) TRAINABLE VIDEOREALISTIC SPEECH ANIMATION

(75) Inventors: Tomaso A. Poggio, Wellesley, MA (US); Antoine F. Ezzat, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 709 days.

(21) Appl. No.: 10/352,319

(22) Filed: Jan. 27, 2003

(51) Int. Cl.
*G09B 19/04* (2006.01)

(52) U.S. Cl. ............... 434/185; 434/156; 434/169; 434/307 R; 704/260; 345/473

(58) Field of Classification Search ........... 434/118, 434/156, 157, 169, 185, 307 R, 308, 362, 434/365; 704/256, 260, 271, 276; 345/473, 345/619; 715/500, 500.1, 854; 709/231; 707/10; 382/118
See application file for complete search history.

(56) References Cited

U.S. PATENT DOCUMENTS

| | | | | |
|---|---|---|---|---|
| 5,111,409 A | * | 5/1992 | Gasper et al. ........... 715/500.1 |
| 5,613,056 A | * | 3/1997 | Gasper et al. ............... 345/473 |
| 5,903,892 A | * | 5/1999 | Hoffert et al. ................ 707/10 |
| 6,181,351 B1 | * | 1/2001 | Merrill et al. .............. 345/473 |
| 6,250,928 B1 | | 6/2001 | Poggio et al. |
| 6,377,925 B1 | * | 4/2002 | Greene et al. .............. 704/271 |
| 6,539,354 B1 | * | 3/2003 | Sutton et al. ............... 704/260 |
| 6,564,263 B1 | * | 5/2003 | Bergman et al. ........... 709/231 |
| 6,593,936 B1 | * | 7/2003 | Huang et al. ............... 345/619 |
| 6,600,502 B1 | * | 7/2003 | Brewster, Jr. ............... 715/854 |
| 6,622,171 B2 | * | 9/2003 | Gupta et al. ................ 709/231 |
| 6,654,018 B1 | * | 11/2003 | Cosatto et al. ............. 345/473 |
| 6,735,566 B1 | * | 5/2004 | Brand ........................ 704/256 |
| 6,735,738 B1 | * | 5/2004 | Kojima .................... 715/500.1 |
| 6,766,299 B1 | * | 7/2004 | Bellomo et al. ............ 704/276 |
| 6,813,607 B1 | * | 11/2004 | Faruquie et al. ............ 704/276 |
| 6,919,892 B1 | * | 7/2005 | Cheiky et al. .............. 345/473 |
| 2002/0194006 A1 | * | 12/2002 | Challapali ................... 704/276 |
| 2003/0040916 A1 | * | 2/2003 | Major ........................ 704/276 |
| 2004/0120554 A1 | * | 6/2004 | Lin et al. .................... 382/118 |

OTHER PUBLICATIONS

Cook, Gareth, "At MIT, they can put words in our mouths," *Boston Globe*, May 15, 2002, http://cuneus.ai.mit.edu:8000/research/mary101/news/bostonglobe-ezzat.shtml (downloaded Nov. 14, 2002), 3 pp.

(Continued)

*Primary Examiner*—Joe H. Cheng
(74) *Attorney, Agent, or Firm*—Hamilton, Brook, Smith & Reynolds, P.C.

(57) ABSTRACT

A method and apparatus for videorealistic, speech animation is disclosed. A human subject is recorded using a video camera as he/she utters a predetermined speech corpus. After processing the corpus automatically, a visual speech module is learned from the data that is capable of synthesizing the human subject's mouth uttering entirely novel utterances that were not recorded in the original video. The synthesized utterance is re-composited onto a background sequence which contains natural head and eye movement. The final output is videorealistic in the sense that it looks like a video camera recording of the subject. The two key components of this invention are 1) a multidimensional morphable model (MMM) to synthesize new, previously unseen mouth configurations from a small set of mouth image prototypes; and 2) a trajectory synthesis technique based on regularization, which is automatically trained from the recorded video corpus, and which is capable of synthesizing trajectories in MMM space corresponding to any desired utterance.

20 Claims, 10 Drawing Sheets

OTHER PUBLICATIONS

Ezzat, T. et al., "Trainable Videorealistic Speech Animation," *Proc. of SIGGRAPH 2002*, San Antonio, Texas (11 pp.).
Barron, J.L., et al., "Performance of Optical Flow Techniques," *Int. Jnl. of Computer Vision* 12(1): 43-77 (1994). Also, http://www.csd.uwo.ca/faculty/barron/PAPERS/ijcv94.ps.
Beymer, D. and T. Poggio, "Image representations for visual learning," *Science* 272, (1966) 31 pp. Also, http://www.ai.mit.edu/projects/cbcl/publications/ps/science-beymer.ps.
Black, M. et al., "Robustly Estimating Changes in Image Appearance," *Computer Vision and Image Understanding, Special Issue on Robust Statistical Techniques in Image Understanding*, pp. 8-31 (2000). Also, http://www.cs.brown.edu/people/black/Papers/cviu.1999.0825.pdf.
Blanz, V. and T. Vetter, "A Morphable Model for the Synthesis of 3D Faces," in *Proceedings of SIGGRAPH 2001, ACM Press/ACM SIGGRAPH*, Los Angeles, 187-194 (1999). Also, http://www.mpi-sb.mpg.de/~blanz/publications/morphmod2.pdf.
Brand, M. and A. Hertzmann, "Style Machines," in *Proceedings of SIGGRAPH 2000, ACM Press/ACM SIGGRAPH*, 183-192 (2000). Also http://www.merl.com/papers/docs/TR2000-14.pdf.
Brand, M., "Voice Puppetry," draft of Dec. 7, 1998, final version in *Proceedings of SIGGRAPH 1999, ACM Press/ACM SIGGRAPH*, Los Angeles, 21-28 (1999). Also, http://www.merl.com/papers/docs/TR99-20.pdf.
Burt, P.J. and E.H. Adelson, "The Laplacian Pyramid as a Compact Image Code," *IEEE Trans. on Communications, COM-31*, 4 (Apr.) 532-540 (1983). Also, http://www-bcs.mit.edu/people/adelson/pub_pdfs/pyramid83.pdf.
Cootes, T.F. et al., "Active Appearance Models," in *Proceedings of the European Conference on Computer Vision* (1998) 16 pp.. Also, http://www.wiau.man.ac.uk/~bim/Models/aam.ps.gz.
Cosatto, E. and H.P. Graf, "Sample-Based Synthesis of Photorealistic Talking Heads," in *Proceedings of Computer Animation '98*, pp. 103-110 (1998). Also, http://www.research.att.com/~eric/papers/CA98.pdf.
Ezzat, T. and T. Poggio, "Visual Speech Synthesis by Morphing Visemes," *International Journal of Computer Vision* 38, 45-57 (2000). Also, http://cuneus.ai.mit.edu:8000/publications/AIM-1658.pdf.
Girosi, F. et al., "Priors, Stabilizers, and Basis Functions: From regularization to radial, tensor and additive splines," Tech. Rep. 1430, MIT AI Lab, Jun. 1993, 28 pp. Also, ftp://publications.ai.mit.edu/ai-publications/1000-1499/AIM-1430.ps.Z.
Guenter, B. et al., "Making Faces," in *Proceedings of SIGGRAPH 1998, ACM Press/ACM SIGGRAPH, Computer Graphics Proceedings, Annual Conference Series, ACM* 55-66 (1998). Also, http://research.microsoft.com/MSRSIGGRAPH/1998/pdf/makingfaces.pdf.
Huang, X. et al., "The SPHINX-99 Speech Recognition System: An Overview," *Computer Speech and Language* 7(2):137-143 (1993).
Jones, M.J. and T. Poggio, "Multidimensional Morphable Models", in *Proceedings of International Conference on Computer Vision* (1998) 7 pp.. http://www.ai.mit.edu/projects/cbcl/publications/ps/ICCV98-matching2.ps.
Lee, S. et al., "Image Metamorphosis Using Snakes and Free-Form Deformations," in *Proceedings of SIGGRAPH 1995, ACM Press/ACM SIGGRAPH, vol. 29 of Computer Graphics Proceedings, Annual Conference Series, ACM*, pp. 439-448 (1995). Also, http://www.postech.ac.kr/~leesy/ftp/sig95.pdf.
Lee, S. et al., "Polymorph: Morphing among Multiple Images," *IEEE Computer Graphics and Applications* 18, 58-71 (1998). Also, http://www.postech.ac.kr/~leesy/ftp/cgna98.pdf.
Masuko, T. et al., "Text-to-visual speech synthesis based on parameter generation from hmm," in *ICASSP* (1998) 4 pp. Also, http://sp-www.ip.titech.ac.jp/research/pdf/icassp98-avsynHMM.pdf.
Pighin, F. et al., "Synthesizing Realistic Facial Expressions from Photographs," in *Proceedings of SIGGRAPH 1998, ACM Press/ACM SIGGRAPH, Computer Graphics Proceedings, Annual Conference Series, ACM*, 75-84 (1998). Also, http://www.ict.usc.edu/~pighin/publications/realface.pdf.
Poggio, T. and T. Vetter, "Recognition and Structure from one 2D Model View: Observations on Prototypes, Object Classes and Symmetries," Tech. Rep. 1347, Artificial Intelligence Laboratory, MIT (1992). Also, ftp://publications.ai.mit.edu/ai-publications/pdf/AIM-1347.pdf.
Roweis, S., "EM Algorithms for PCA and SPCA" in *Advances in Neural Information Processing Systems*, The MIT Press, vol. 10 (1998). Also, http://www.cs.toronto.edu/~roweis/papers/empca.pdf.
Sjolander, K. and J. Beskow, "Wavesurfer—an open source speech tool," in *Proc. of ICSLP*, vol. 4, 464-467 (2000). Also, http://www.speech.kth.se/wavesurfer/wsurf_icslp00.pdf.
Tenenbaum, J.B. et al., "A Global Geometric Framework for Nonlinear Dimensionality Reduction," *Science*, vol. 290, pp. 2319-2323 (Dec. 2000).
Tipping, M.E. and C.M. Bishop, "Mixtures of Probabilistic Principal Component Analyzers," *Neural Computation* 11(2):443-482 (1999). Also, ftp://ftp.research.microsoft.com/users/mtipping/msrc-mppca.ps.gz.
Waters, K., "A Muscle Model for Animating Three-Dimensional Facial Expression," in *Computer Graphics (Proceedings of ACM SIGGRAPH 87)*, 21(4) ACM, 17-24 (Jul. 1987). Also, http://www.cs.dartmouth.edu/~cs43/papers/facial/p17-waters.pdf.
Bergen, J.R. et al., "Hierarchical Model-Based Motion Estimation," in *Proceedings of the European Conference on Computer Vision*, 237-252 (1992).
Brooke, N.M. and S.D. Scott, "Computer Graphics Animations of Talking Faces Based on Stochastic Models," in *Intl. Symposium on Speech, Image Processing, and Neural Networks*, 73-76 (1994).
Moulines, E. and F. Charpentier, "Pitch-synchronous waveform processing techniques for text-to-speech synthesis using diphones," *Speech Communication* 9, 453-467 (1990).
Pearce, A. et al., "Speech and expression: A computer solution to face animation," in *Graphics Interface*, 136-140 (1986).
Parke, F.I., "A Parametric Model for Human Faces," Doctoral Dissertation, University of Utah, 1974 (113 pp.).
Beier, T. and S. Neely, "Feature-Based Image Metamorphosis," *Computer Graphics (Proceedings of ACM SIGGRAPH 92)* vol. 26(2), ACM, 35-42.
Beymer, D. et al., "Example Based Image Analysis and Synthesis," Tech. Report 1431, MIT AI Lab 1993 (21 pp.).
Black, A.W. et al., "The Festival Speech Synthesis System," *University of Edinburgh*, Abstract, 3 pp.
Bregler, C. et al., "Video Rewrite: Driving Visual Speech with Audio," in *Proceedings of SIGGRAPH 1997, ACM Press/ACM SIGGRAPH*, Los Angeles, Computer Graphics Proceedings, Annual Conference Series, ACM (8 pp.).
Horn, B.K.P. and B.G. Schunk, "Determining Optical Flow," in *Artificial Intelligence*, pp. 185-203 (1981).
Cohen, M.M. and D.W. Massaro, "Modeling Coarticulation in Synthetic Visual Speech," in *Models and Techniques in Computer Animation*, N.M. Thalmann and D. Thalmann, Eds., Springer-Verlag, Tokyo (18 pp.).
LeGoff, B. and C. Benoit, "A Text-to-Audiovisual-Speech Synthesizer for French," in *Proceedings of the International Conference on Spoken Language Processing (ICSLP)*, 1996 (2 pp.).
Scott, K.C. et al., "Synthesis of Speaker Facial Movement to Match Selected Speech Seqences," in *Proceedings of the Fifth Australian Conference on Speech Science and Technology*, vol. 2 (7 pp.).
Watson, S.H. et al., "An Advanced Morphing Algorithm for Interpolating Phoneme Images to Simulate Speech," Jet Propulsion Laboratory, California Institute of Technology, 1997 (11 pp.).
Chen, E.C. and L. Williams, "View Interpolation for Image Synthesis," in *Proceedings of SIGGRAPH 1993, ACM Press/ACM SIGGRAPH*, Computer Graphics Proceedings, Annual Conference Series, ACM, 279-288.
Lee, Y. et al., "Realistic Modeling for Facial Animation," in *Proceedings of SIGGRAPH 1995, ACM Press/ACM SIGGRAPH*, Computer Graphics Proceedings, Annual Conference Series, ACM, 55-62.
Ezzat, T. et al., "Trainable Videorealistic Speech Animation," in *ACM Transactions on Graphics* 21(3):388-398 (2002).
Bishop, C.M., "Neural Networks for Pattern Recognition," *Clarendon Press*, Oxford 1995 (table of contents).
Cormen, T.H. et al., "Introduction to Algorithms," The MIT Press and McGraw-Hill Book Company, 1989 (table of contents).
Wahba. G., "Splines Models for Observational Data," *Series in Applied Mathematics*, vol. 59, Society for Industrial and Applied Mathematics, Philadelphia 1990 (table of contents).
Wolberg, G. "Digital Image Warping," *IEEE Computer Society Press*, Los Alamitos, 1990 (table of contents).

* cited by examiner

PRE-PROCESSING

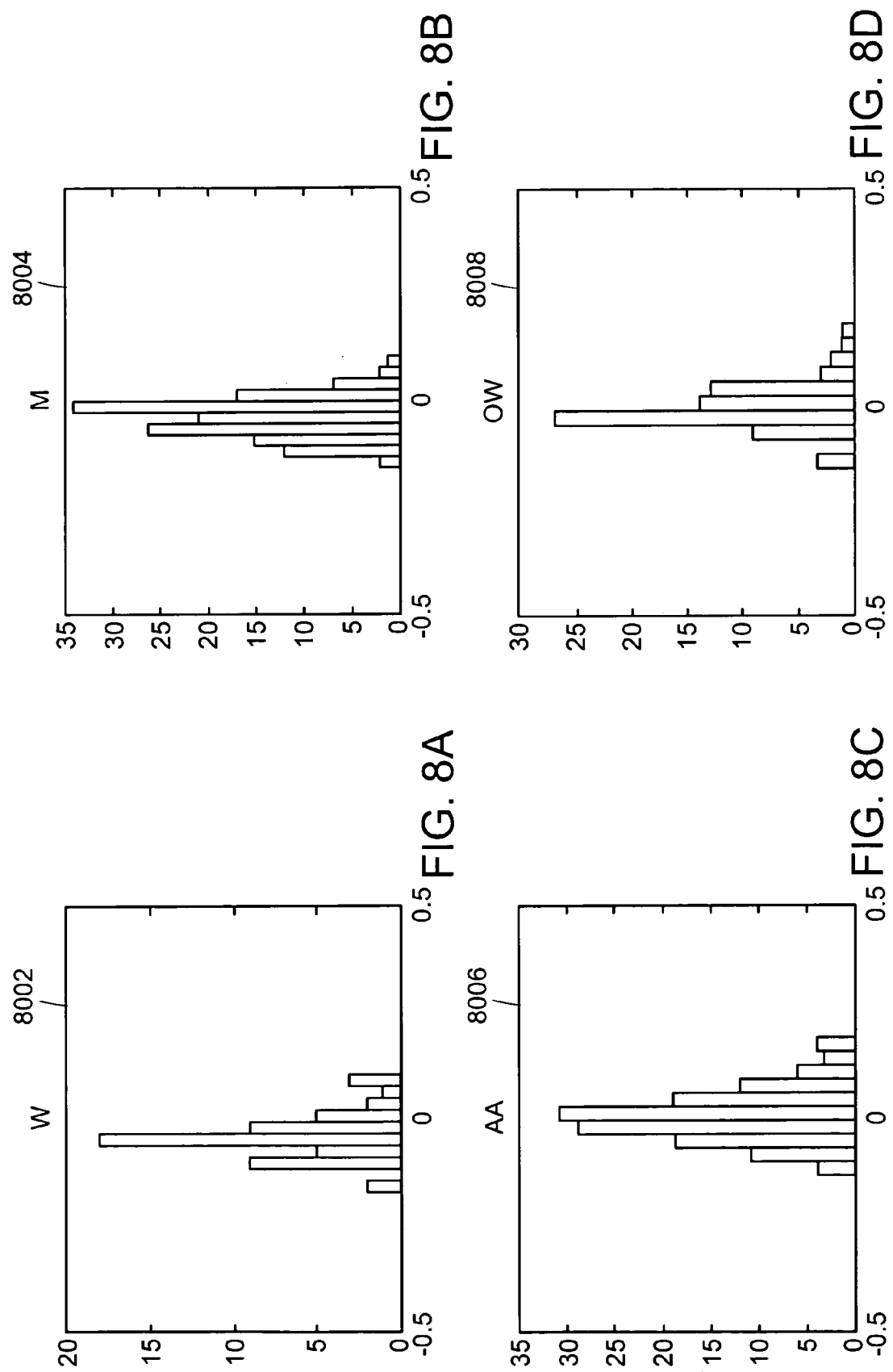

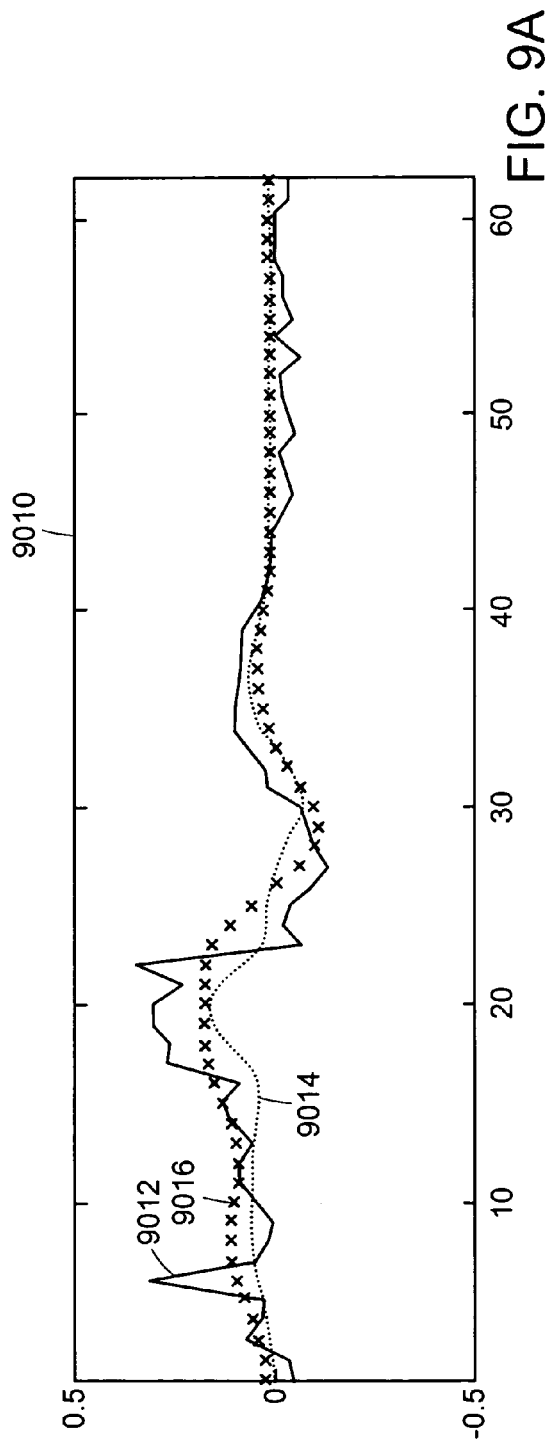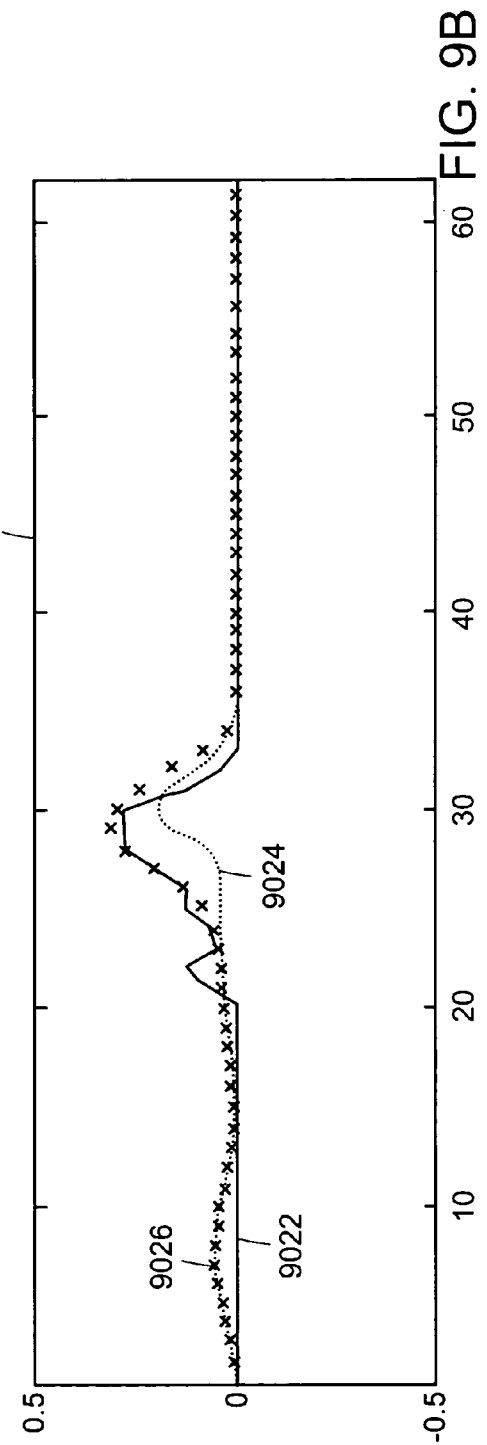

TRAINABLE VIDEOREALISTIC SPEECH ANIMATION

GOVERNMENT SUPPORT

The invention was supported, in whole or in part, by a grant IIS-9800032 from the National Science Foundation. The Government has certain rights in the invention.

BACKGROUND OF THE INVENTION

Facial Modeling

One approach to model facial geometry is to use 3D methods. Parke (Parke, F. I., "A parametric model of human faces", Ph.D. thesis, University of Utah, 1974) was one of the earliest to adopt such an approach by creating a polygonal facial model. To increase the visual realism of the underlying facial model, the facial geometry is frequently scanned in using Cyberware laser scanners. Additionally, a texture map of the face extracted by the Cyberware scanner may be mapped onto the three-dimensional geometry (Lee, Y. et al., "Realistic modeling for facial animation," In *Proceedings of SIGGRAPH* 1995, ACM Press/ACM SIGGRAPH, Los Angeles, *Computer Graphics Proceedings, Annual Conference Series*, ACM 55–62). Guenter (Guenter, B. et al., "Making faces", In *Proceedings of SIGGRAPH* 1998, ACM Press/ACM SIGGRAPH, Orlando, Fla., Computer Graphics Proceedings, Annual Conference Series, ACM, 55–56) demonstrated recent attempts at obtaining 3D face geography from multiple photographs using photogrammetric techniques. Pighin et al. (Pighin, F. et al., "Synthesizing realistic facial expressions from photographs," In *Proccedings of SIGGRAPH* 1998, ACM Press/ACM SIGGRAPH, Orlando, Fla., Computer Graphics *Proceedings, Annual Conference Series, ACM*, 75–84) captured face geometry and textures by fitting a generic face model to a number of photographs. Blanz and Vetter (Blanz, V. and T. Vetter, "A morphable model for the synthesis of 3D faces", In *Proceedings of SIGGRAPH* 2001, ACM Press/ACM SIGGRAPH, Los Angeles, A Rockwood, Ed., *Computer Graphics Proccedings, Annual Conference Series*, ACM, 187–194) demonstrated how a large database of Cyberware scans may be morphed to obtain face geometry from a single photograph.

An alternative to the 3D modeling approach is to model the talking face using image-based techniques, where the talking facial model is constructed using a collection of example images captured of the human subject. These methods have the potential of achieving very high levels of videorealism and are inspired by the recent success of similar sample-based methods for audio speech synthesis (Moulines, E. and F. Charptentier, "Pitch-synchronous waveform processing techniques for text-to-speech synthesis using diphones," *Speech Communication* 9, 453–467, 1990).

Image-based facial animation techniques need to solve the video generation problem: How does one build a generative model of novel video that is simultaneously photorealistic, videorealistic and parsimonious? Photorealism means that the novel generated images exhibit the correct visual structure of the lips, teeth and tongue. Videorealism means that the generated sequences exhibit the correct motion, dynamics and coarticulation effects. Parsimony means that the generative model is represented compactly using a few parameters.

Bregler, Covell and Slaney (Bregler, C. et al., "Video rewrite: Driving visual speech with audio," In *Proceedings of SIGGRAPH* 1997, ACM Press/ACM SIGGRAPH, Los Angeles, *Computer Graphics Proceedings, Annual Conference Series*, ACM, 353–360) describe an image-based facial animation system called Video Rewrite in which the video generation problem is addressed by breaking down the recorded video corpus into a set of smaller audiovisual basis units. Each one of these short sequences is a triphone segment, and a large database with all the acquired triphones is built. A new audiovisual sentence is constructed by concatenating the appropriate triphone sequences from the database together. Photorealism in Video Rewrite is addressed by only using recorded sequences to generate the novel video. Videorealism is achieved by using triphone contexts to model coarticulation effects. In order to handle all the possible triphone contexts, however, the system requires a library with tens and possibly hundreds of thousands of subsequences, which seems to be an overly redundant and non-parsimonious sampling of human lip configurations. Parsimony is thus sacrificed in favor of videorealism.

Essentially, Video Rewrite adopts a decidedly agnostic approach of animation: since it does not have the capacity to generate novel lip imagery from a few recorded images, it relies on the resequencing of a vast amount of original video. Since it does not have the capacity to model how the mouth moves, it relies on sampling the dynamics of the mouth using triphone segments.

SUMMARY OF THE INVENTION

The present invention provides a system and method for videorealistic speech animation, which includes recording a human subject with a video camera, processing the recorded data automatically, and then re-animating that subject uttering entirely novel utterances which were not included in the original recording (corpus). Novel audio may be provided as input to the system. This audio may be either real human audio (from the same subject or a different subject), or synthetic audio produced by a text-to-speech system (TTS). The audio may be phonetically transcribed and aligned. In the case of synthetic audio from TTS systems, this phonetic alignment is readily available from the TTS system itself (Black, A. and P. Taylor," *The Festival Speech Synthesis System*, University of Edinburgh 1997). In the case of real audio, publicly available phonetic alignment systems may be used (Huang, X. et al., "The PHYINX-II speech recognition system: an overview (http://sourceforge.net/projects/smusphinx/), *Computer Speech and Language* 7, 2, 137–148, 1993).

A visual speech processing system of the preferred embodiment is composed of two modules: the first module is the multidimensional morphable model (MMM) which is capable of morphing between a small set of prototype mouth images to synthesize new, previously unseen mouth configurations. The second component (module) is a trajectory synthesis module, which uses regularization to synthesize smooth trajectories in MMM space for any specified utterance (Girosi F. et al., "Priors, stablizers, and basis functions: From regularization to radial, tensor, and additive splines, *Tech. Rep.* 1430, MIT AI Lab, June (1993); Wabha, G., "Splines Models for Observational Data," Series in *Applied Mathematics*, Vol. 59, SIAM, Philadelphia, 1990). The parameters of the trajectory synthesis module are trained automatically from the recorded corpus using gradient descent learning.

Recording the video corpus takes on the order of fifteen minutes. Processing of the corpus takes on the order of several days, but, apart from the specification of head and eye masks shown in connection with FIG. 2b, is fully automatic, requiring no intervention on the part of the user. The final visual speech synthesis module consists of a small set of prototype images (46 images in the example described below) extracted from the recorded corpus and used to synthesize all novel sequences.

Application scenarios for videorealistic speech animation may include: user-interface agents for desktops, TV's, or cell phones; digital actors in movies, virtual avatars in chatrooms; very low bitrate coding schemes (such as MPEG4); and studies of visual speech production and perception. The recorded subjects can be regular people, celebrities, ex-presidents, or infamous terrorists.

In a preferred embodiment, a computer apparatus, system and/or method for generating a videorealistic audio-visual animation of a subject comprises the computer implemented steps of:

(a) receiving video recorded data of a subject including sound data of the subject enunciating certain speech and image data of the subject posing certain facial configurations;

(b) forming a multidimensional model based on the video recorded data, said model synthesizing at least images of new facial configurations, wherein for synthesizing images of new facial configurations, the model employs morphing according to mouth parameters;

(c) for a given target speech stream or a given target image stream, mapping from the target stream to a trajectory of parameters in the model, the trajectory of parameters enabling the model to generate at least one of (1) synthesized images of new facial configurations of the subject for the target stream and (2) synthesized speech sound of new speech of the subject for the target stream, wherein for synthesizing images of new facial configurations, the model uses the trajectory of parameters to smoothly morph between a subset of images of the certain facial configurations of the video recorded data; and (d) rendering video images and speech sound from the synthesized images of new facial configurations of the subject and the target stream, such that a videorealistic audio-visual animation of the subject is produced.

In particular, the model employs morphing according to a mouth shape parameter $\alpha$ and a mouth appearance parameter $\beta$. The step of forming the multidimensional model thus includes:

for each image of a subset of images from the image data of the video recorded data, computing optical flow vectors C from the image to every other image in the subset;

computing a mouth shape parameter $\alpha$ value and a mouth appearance parameter $\beta$ value for each image of the subset; and based on the computed mouth shape parameter $\alpha$ values and computed mouth appearance parameter $\beta$ values, forming Gaussian clusters for respective phonemes. Each Gaussian cluster has a means $\mu$ and diagonal covariance $\Sigma$ for mathematically representing the respective phoneme, such that (i) given a target set of $\alpha$, $\beta$ values, the model produces a morph image of the subject having a mouth with a mouth shape and mouth appearance configuration corresponding to the target $\alpha$, $\beta$ values, and (ii) given a target mouth image, the model computes $\alpha$, $\beta$ values that represent the target mouth image with respect to the images in the subset.

Given a target $\alpha$, $\beta$, the model produces a morph image I according to $$I^{morph}(\alpha, \beta) = \sum_{i=1}^{N} \beta_i W\left(I_i, W\left(\sum_{j=1}^{N} \alpha_j C_j - C_i, C_i\right)\right)$$

where W is a forward warping operator.

Given a target speech stream, the step of mapping employs the relationship $(D^T\Sigma^{-1}D+\lambda W^T W)y=D^T\Sigma^{-1}D\mu$ to generate a trajectory y having T ($\alpha$, $\beta$ parameter values. From the generated trajectory of a $\alpha$, $\beta$ parameter values, the model produces a set of morph images of the subject corresponding to the target speech stream. D is a duration-weighting matrix, $\lambda$ is a regularizer, and W is a first order difference operator.

The preferred embodiment may further comprise the step of adjusting means $\mu$ and covariances $\Sigma$ using gradient descent learning.

In the preferred embodiment, the step of mapping further includes employing mathematical regularization to generate the trajectory of parameters. The regularization may include a smoothness term.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates 24 of 46 image prototypes included in the multidimensional morphable model of the embodiment in FIG. 1.

FIGS. 8a–8d are histograms for the ($\alpha_1$) parameter for the \w\, \m\, \aa\ and \ow\ phonemes respectively.

FIGS. 9a and 9b are graphics depicting synthesized trajectories for the $\alpha_{12}$ and $\beta_{28}$ parameters respectively, before training and after training for optional levels of smoothness and regularization.

DETAILED DESCRIPTION OF THE INVENTION

Figure 1:
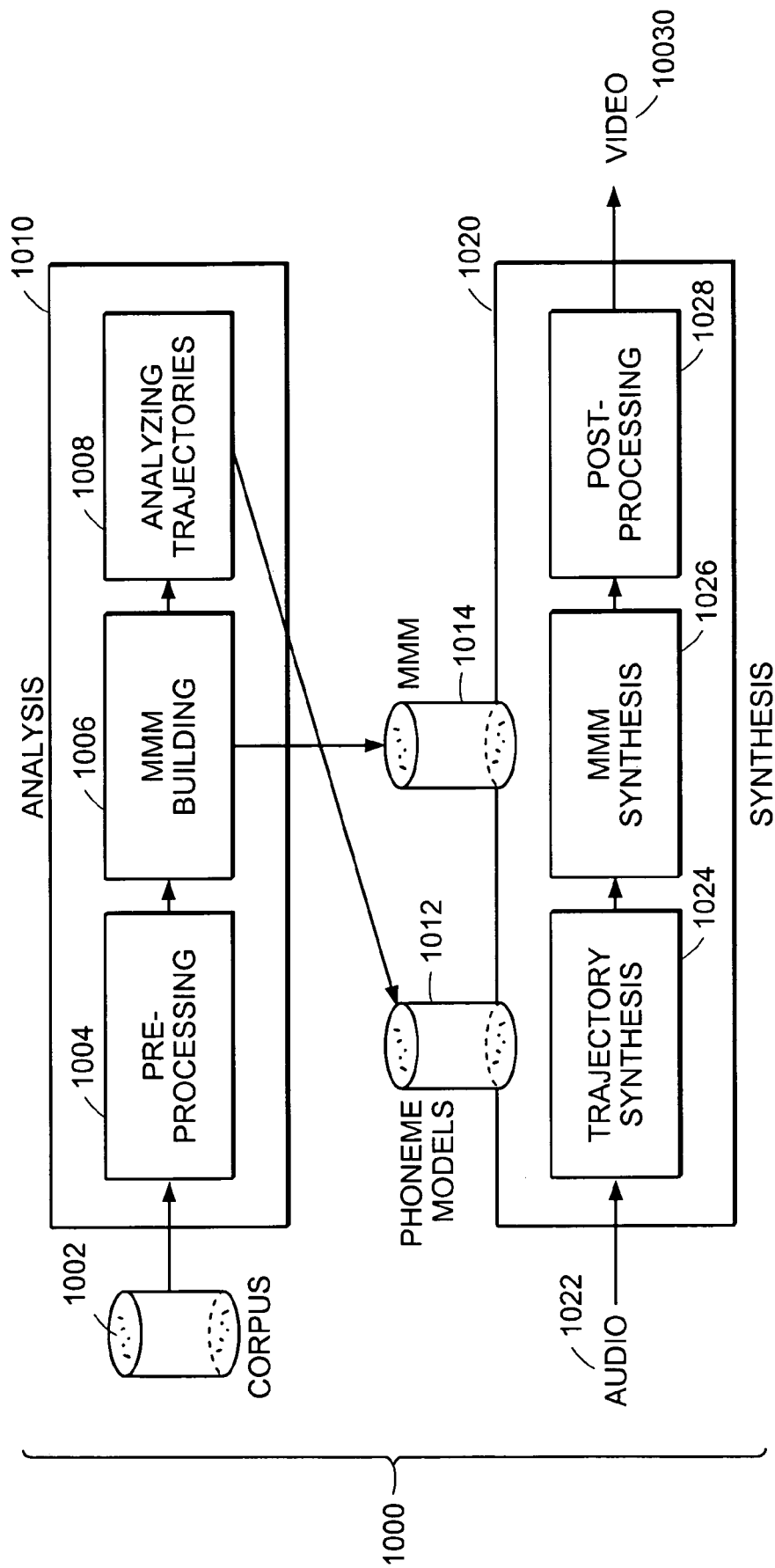
FIG. 1 is a block diagram of a preferred embodiment of the present invention.

Applicants present an approach to solving the video generation problem that has the capacity to generate novel video from a small number of examples as well as the capacity to model how the mouth moves. This approach is based on the use of a multidimensional morphable model (MMM), which is capable of multidimensional morphing between various lip images to synthesize new, previously unseen lip configurations. MMM's have been discussed in other works (Poggio, T. and T. Vetter, "Recognition and structure from one 2D model view: observations on prototypes, object classes and symmetrics," *Tech. Rep.* 1347, Artificial Intelligence Laboratory, Massachusetts Institute of Technology (1992); Beymer D. and T. Poggio, "Image representations for visual learning," *Science* 272, 1905–1909 (1996); Cootes, T. F. et al., "Active appearance models," In *Proceedings of the European Conference on Computer Vision* (1998); Jones, M. and T. Poggio, "Multidimensional morphable models: A framework for representing and matching object classes," In *Proceedings of the International Conference on Computer Vision* (1998); Lee, S. Y. et al., "Polymorph: An algorithm for morphing among multiple images," *IEEE Computer Graphics Applications* 18, 58–71 (1998); Blanz and Vetter (Blanz, V. and T. Vetter, "A morphable model for the synthesis of 3D faces", In *Proceedings of SIGGRAPH* 2001, ACM Press/ACM SIGGRAPH, Los Angeles, A. Rockwood, Ed., *Computer Graphics Proccedings, Annual Conference Series*, ACM, 187–194); and Black, M. et al., "Robustly estimating changes in image appearance," *Computer Vision and Image Understanding, Special Issue on Robust Statistical Techniques in Image Understanding*, 8–31 (2000). These works are incorporated herein by reference. An MMM variant and its utility for facial animation is presented in the present invention.

MMM's are powerful models of image appearance because they combine the power of vector space representations with the realism of morphing as a generative image technique. Prototype example images of the mouth are decomposed into pixel flow and pixel appearance axes that represent basis vectors of image variation. These basis vectors are combined in a multidimensional fashion to produce novel, realistic, previously unseen lip configurations.

As such, the MMM is more powerful than other vector space representations of images, which do not model pixel flow explicitly. Cosatto E. and H. Graf, "Sample-based synthesis of photorealistic talking heads," in *Proceedings of Computer Animation*, 103–110 (1998), for example, describe an approach which is similar to the present invention, except that the Cosatto and Graf generative model involved simple pixel blending of images, which fails to produce realistic transitions between mouth configurations. An MMM is also more powerful than simple 1-dimensional morphing between 2 image end points (Beier, T. and S. Neely, "Feature-based image metamorphosis," In Computer Graphics (Proceedings of ACM SIGGRAPH 92), Vol. 26(2), ACM, 35–42) as well as techniques such as those of Scott et al. (Scott, K. et al., "Synthesis of speaker facial movement to match selected speech sequences," In *Proceedings of the Fifth Australian Conference on Speech Science and Technology*, Vol. 2, 620–625 (1994)), and Ezzat and Poggio (Ezzat, T. and T. Poggio, "Visual speech synthesis by morphing visemes," *International Journal of Computer Vision* 38, 45–57 (2000)), which morphed between several visemes in a pairwise fashion. By embedding the prototype images in a vector space, an MMM is capable of generating smooth curves through lip space which handle complex speech animation effects in a non-ad-hoc manner.

Speech animation techniques have traditionally included both keyframing methods and physics-based methods, and have been extended more recently to include machine learning methods. In keyframing, the animator specifies particular key-frames, and the system generates intermediate values (Parke, F. I., "A parametric model of human faces", Ph.D. thesis, University of Utah, 1974; Pearce, A. et al., "Speech and expression: A computer solution to face animation," In *Graphics Interface*, (1986); Cohen, M. M. and D. W. Massaro, "Modeling coarticulation in synthetic visual speech," In *Models and Techniques in Computer Animation*, N. M. Thalmann and D. Thalmann, Eds., Springer-Verlag, Tokyo, 139–156 (1993); LeGoff, B. and C. Benoit, "A text-to-audiovisual speech synthesizer for French," in *Proceedings of the International Conference on Spoken Language Processing (ICSLP)* (1996). In physics-based methods, the animator relies on the laws of physics to determine the mouth movement, given some initial conditions and a set of forces for all time. This technique, which requires modeling the underlying facial muscles and skin was demonstrated quite effectively by Waters (Waters, K., "A muscle model for animating three-dimensional facial expressions," in *Computer Graphics (Proceedings of ACM SIGGRAPH* 87), Vol. 21(4), ACM, 17–24) and Lee et al. (Lee, Y. et al., "Realistic modeling for facial animation," In *Proceedings of SIGGRAPH* 1995, ACM Press/ACM SIGGRAPH, Los Angeles, *Computer Graphics Proceedings, Annual Conference Series*, ACM 55–62).

Finally, machine learning methods are a new class of animation tools which are trained from recorded data and then used to synthesize new motion. Examples include hidden markov models (HMM's), which were demonstrated effectively for speech animation by Brand (Brand, M., "Voice puppetry," in *Proceedings of SIGGRAPH* 1999, ACM Press/ACM SIGGRAPH, Los Angeles, A. Rockwood, Ed., *Computer Graphics Proceedings, Annual Conference Series*, ACM, 21–28), Masuko et al. (Masuko, T. et al., "Test-to-visual speech synthesis based on parameter generation from hmm," in ICASSP 1998) and Brooke and Scott (Brooke, N. and S. Scott, "Computer graphics animations of talking faces based on stochastic models," in *Intl. Symposium on Speech, Image Processing, and Neural Networks*, 1994).

Speech animation needs to solve several problems simultaneously: firstly, the animation needs to have the correct motion, in the sense that the appropriate phonemic targets need to be realized by the moving mouth. Secondly, the animation needs to be smooth, not exhibiting any unnecessary jerks. Thirdly, it needs to display the correct dynamics: plosives such as b and p need to occur fast. Finally, speech animation needs to display the correct co-articulation effects, which determine the effects of neighboring phonemes on the current phoneme shape.

Discussed below in connection with FIGS. 1–10 is a trajectory synthesis module 1020 that addresses the issues of synthesizing mouth trajectories with correct motion, smoothness, dynamics and co-articulation effects. This module 1020 maps from an input stream 1022 of phonemes (with their respective frame durations) to a trajectory of MMM shape-appearance parameters $(\alpha, \beta)$. This trajectory is then fed into the MMM 1014 to synthesize the final visual stream 1003 that represents the talking face.

Unlike Video Rewrite (Bregler, C. et al., "Video rewrite: Driving visual speech with audio," In *Proceedings of SIGGRAPH* 1997, ACM Press/ACM SIGGRAPH, Los Angeles, Computer Graphics Proceedings, Annual Conference Series, ACM, 353–360), which relies on an exhaustive sampling of triphone segments to model phonetic contexts, co-articulation effects in the system of the present application emerge directly from a described speech model. Each phoneme in the described model is represented as a localized Gaussian target region in MMM space with a particular position and covariance. The covariance of each phoneme acts as a spring whose tension pulls the trajectory towards each phonetic region with a force proportional to observed co-articulation effects in the data.

However, unlike Cohen and Massaro (Cohen, M. M. and D. W. Massaro, "Modeling coarticulation in synthetic visual speech," In *Models and Techniques in Computer Animation*, N. M. Thalmann and D. Thalmann, Eds., Springer-Verlag, Tokyo, 139–156, 1993), who also modeled co-articulation using localized Gaussian-like regions, the model of co-articulation in the present invention is not hand-tuned, but rather trained from the recorded corpus itself using a gradient descent learning procedure. The training process determines the position and shape of the phonetic regions in MMM space in a manner which optimally reconstructs the recorded corpus data.

A description of preferred embodiments of the invention follows.

An overview of the system of the preferred embodiment is shown in FIG. 1. After recording corpus 1002, analysis is performed in subroutine 1010 to produce the final visual speech module. Analysis 1010 itself consists of three sub-steps: First, the corpus is preprocessed (Step 1004) to align the audio and normalize the images to remove head movement. Next, the MMM 1014 is created from the images in the corpus 1002 in step 1006. Finally, the corpus sequences are analyzed in step 1008 to produce the phonetic models 1012 used by the trajectory synthesis module 1020.

Given a novel audio stream 1022 that is phonetically aligned, synthesis 1020 proceeds in three steps. First, a trajectory synthesis component (step) 1024 is used to synthesize the trajectory in MMM space using the trained phonetic models 1012. Secondly, in step 1026 the MMM 1014 is used to synthesize the novel visual stream from the trajectory parameters of step 1024. Finally, the post-processing stage 1028 composites the novel mouth movement onto a background sequence containing natural eye and head movements. A desired sequence of synthesized images is output at 10030.

Corpus 1002

For the corpus 1002 in one embodiment of the invention, an audiovisual corpus of a human subject uttering various utterances was recorded. Recording was performed at a TV studio against a blue "chroma-key" background with a standard Sony analog TV camera. The data was subsequently digitized at a 29.97 fps NTSC frame rate with an image resolution of 640 by 480 and an audio resolution of 44.1 KHz. The final sequences were stored as Quicktime sequences compressed using a Sorenson coder. The recorded corpus lasts fifteen minutes, and is composed of approximately 30,000 frames.

The example recorded corpus 1002 consists of 1-syllable and 2-syllable words, such as "bed" and "dagger". A total of 152 1-syllable words and 156 2-syllable words were recorded. In addition, the example corpus 1002 includes 105 short sentences, such as "The statue was closed to tourists Sunday". The subject was asked to utter all sentences in a neutral expression. In addition, the sentences themselves are designed to elicit no emotions from the subject.

In an alternative embodiment of the invention, the recorded corpus 1002 may be based on different words and sentences—either those that are close to the text in the desired morphed speech, or those that represent a range of useful phonemes. In yet another embodiment of the invention, the corpus 1002 may be garnered from existing recordings of the subject. For example, available recordings may be used to create a corpus 1002 based on a particular celebrity as the subject.

Pre-Processing (Step 1004)

Returning to FIG. 1, the recorded corpus 1002 data is pre-processed in step 1004 in several ways before it is processed (synthesized 1020) effectively for re-animation.

Firstly, the audio needs to be phonetically aligned in order to be able to associate a phoneme for each image in the corpus 1002. Audio alignment may be performed on all the recorded sequences using an audio alignment system, such as, for example, the CMU Sphinx system, which is publicly available. See Huang et al. cited above. Given an audio sequence and an associated text transcript of the speech being uttered, alignment systems use a forced Viterbi search to find the optimal start and end of phonemes for the given audio sequence. The alignment task is easier than the speech recognition task because the text of the audio being uttered is known a priori.

Figure 2A:
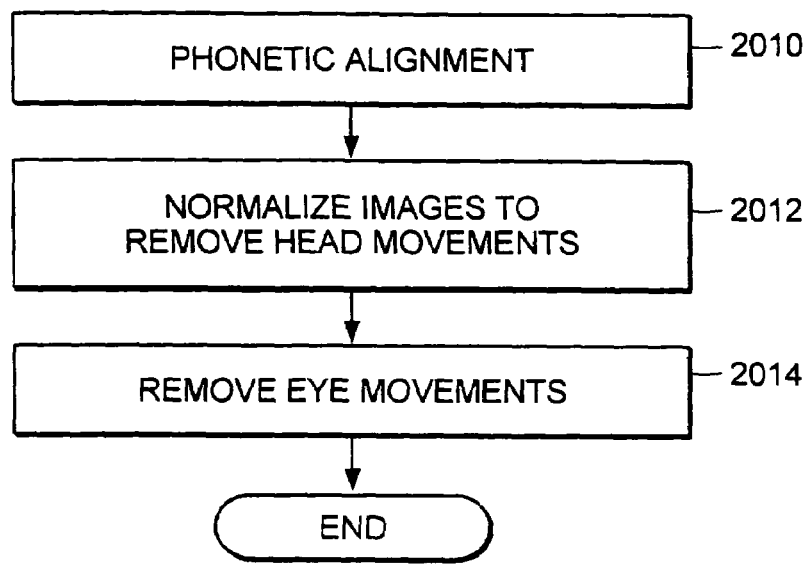
FIG. 2a is a block diagram of a pre-processing mechanism of the embodiment in FIG. 1.
Figure 2B:
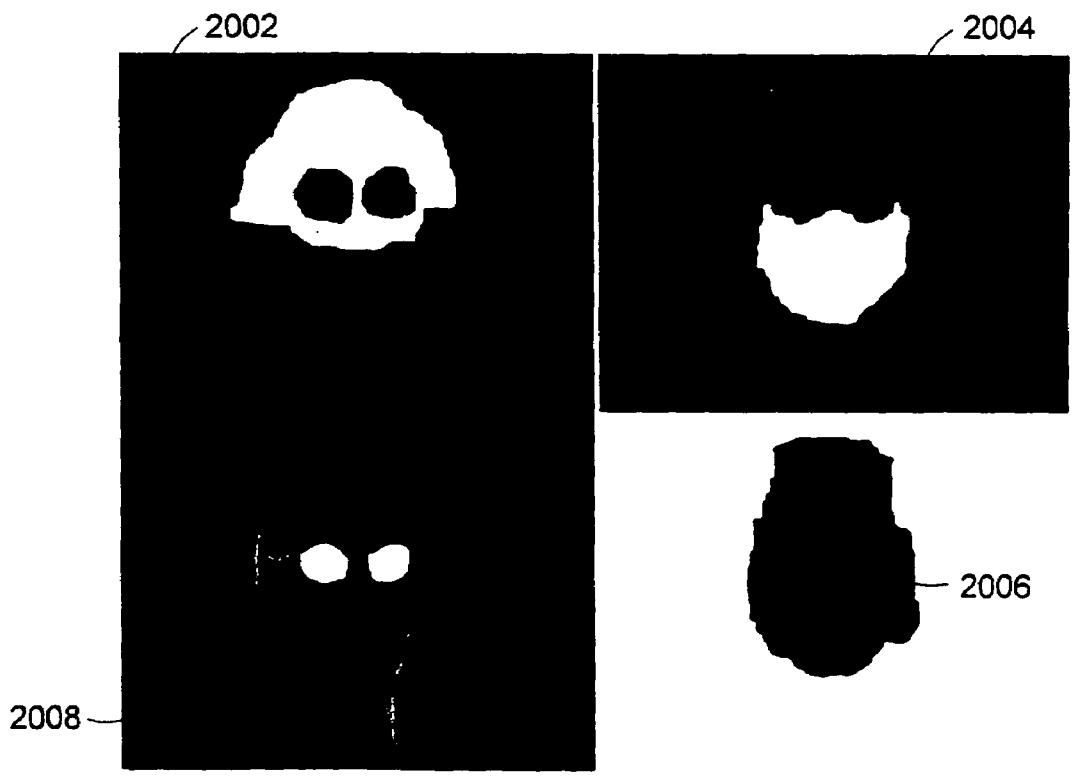
FIG. 2b is a schematic view of the head, mouth, eye and background masks, respectively, used in the preprocessing and post-processing steps of the present invention.

Secondly, each image in the corpus 1002 is normalized so that the only movement occurring in the entire frame is the mouth movement associated with speech. Although the subject in the illustrative embodiment was instructed to keep her head steady during recording, residual head movement nevertheless still exists in the final recorded sequences. Since the head motion is small, a simplifying assumption may be made that the motion can be approximated as the perspective motion of a plane lying on the surface of the face. Planar perspective deformations have eight degrees of freedom, and can be inferred using four corresponding points between a reference frame and the current frame (Wolberg, G., "Digital Image Warping," *IEEE Computer Society Press*, Los Alamitos, Cal. 1990). The preferred embodiment employs optical flow to extract correspondences for 640×480 pixels, and uses least squares to solve the overdetermined system of equations to obtain the eight parameters of the perspective warp. For optical flow see Horn, B. K. P. and B. G. Schunck, "Determining optical flow," *Artificial Intelligence* 17, 185–203, 1981; Barron, J. L. et al., "Performance of optical flow techniques, *International Journal of Computer Vision* 12(1), 43–47, 1994; and Bergen, J. et al., "Hierarchical model-based motion estimation," in *Proceedings of European Conference on Computer Vision*, 237–252, 1992. Among the 640×480 correspondences, only those lying within the head mask 2002 shown in FIG. 2b are used. Pixels from the background area are not used because they do not exhibit any motion at all, and those from the mouth area exhibit non-rigid motion associated with speech. In an alternative embodiment of the invention, where the corpus 1002 is based on available material, rather than the specially-recorded segments, different techniques may be used to separate/extract mouth movements from the rest of the facial movements. Mouth mask 2004 is created and employed accordingly.

The images in the corpus 1002 also exhibit residual eye movement and eye blinks which may need to be removed. An eye mask 2008 is created (see FIG. 2b) which allows just the eyes from a single frame to be pasted onto the rest of the corpus imagery. The eye mask 2008 is blurred at the edges to allow a seamless blend between the pasted eyes and the rest of the face.

Multidimensional Morphable Models (MMM's 1014)

At the heart of the visual speech synthesis approach of the preferred embodiment is the multidimensional morphable model representation, which is a generative model of video capable of morphing between various lip images to synthesize new, previously unseen lip configurations.

The basic underlying assumption of the MMM is that the complete set of mouth images associated with human speech lies in a low-dimensional space whose axes represent mouth appearance variation and mouth shape variation. Mouth appearance is represented in the MMM 1014 as a set of prototype images extracted from the recorded corpus 1002. Mouth shape is represented in the MMM 1014 as a set of optical flow vectors computed automatically from the recorded corpus. (See Horn and Schunck cited above.) In the example illustrated herein, 46 images are extracted and 46 optical flow correspondences are computed. The low-dimensional MMM space is parameterized by shape parameters $\alpha$ and appearance parameters $\beta$.

The MMM 1014 may be viewed as a "black box" capable of performing two tasks: Firstly, given an input set of parameters $(\alpha,\beta)$, the MMM 1014 is capable of synthesizing an image of the subject's face with that shape-appearance configuration. Synthesis 1020 is performed by morphing the various prototype images to produce novel, previously unseen mouth images which correspond to the input parameters $(\alpha,\beta)$.

Conversely, the MMM 1014 can also perform analysis 1010: given an input lip image, the MMM 1014 computes shape and appearance parameters $(\alpha,\beta)$ that represent the position of that input image in MMM 1014 space. In this manner, it is possible to project the entire recorded corpus 1002 onto the constructed MMM 1014, and produce a time series of $(\alpha_1,\beta_1)$ parameters that represent trajectories of mouth motion in MMM space. This operation is referred to as analyzing the trajectories of or simply analyzing 1010 the recorded corpus 1002.

Thus, a multidimensional morphable model 1014 of the present invention may be acquired automatically from a recorded video corpus 1002; it may be used for synthesis 1020; and, finally, such a morphable model 1014 may be used for analysis 1010.

Figure 4:
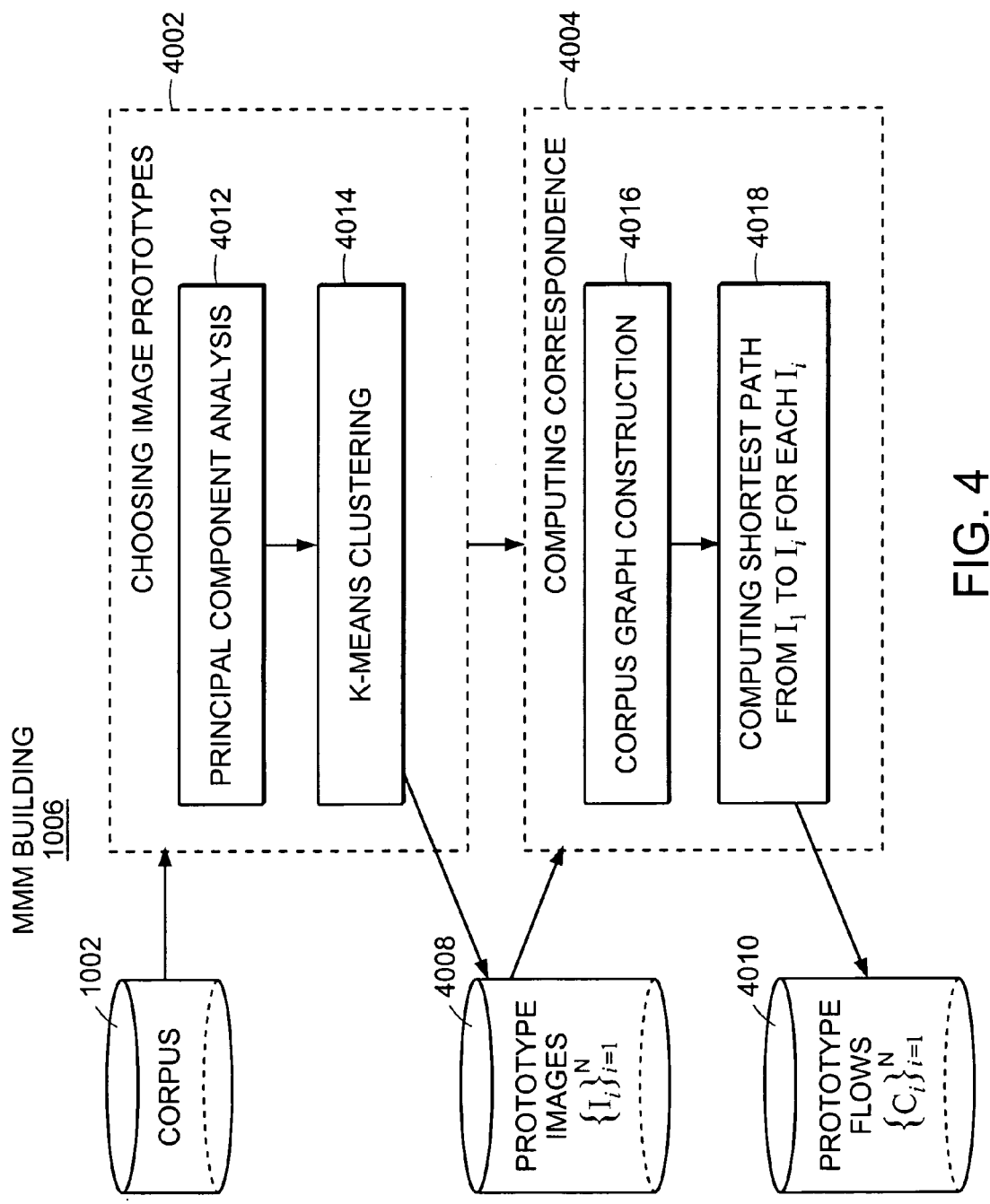
FIG. 4 is a schematic diagram of a model building mechanism of the embodiment in FIG. 1.

FIG. 4 is a schematic diagram of a model building mechanism 1006 (FIG. 1) of the preferred embodiment of the invention. An MMM consists of a set of prototype images $\{I_i\}_{i=1}^N$ 4008 that represent the various lip textures that will be encapsulated by the MMM. One image is designated arbitrarily to be reference image $I_1$.

Additionally, the MMM consists of a set of prototype flows $\{C_i\}_{i=1}^N$ designated 4010 in FIG. 4, that represent the correspondences between the reference image $I_1$ and the other prototype 4008 images in the MMM. The correspondence $C_1$, from the reference image to itself, is designated to be an empty, zero, flow.

In one embodiment of the present invention, correspondence maps may be represented using relative displacement vectors:

$$C_i(p)=\{d_x^i(p),d_y^i(p)\}. \qquad (1)$$

A pixel in image $I_1$ at position $p=(x,y)$ corresponds to a pixel in image $I_i$ at position $(x+d_x^i(x,y),y+d_y^i(x,y))$.

In another embodiment of the invention, feature-based approaches may be adopted for computing the above correspondence. These features-based approaches specify a set of high-level shape features common to both images. See Beier, T. and S. Neely, "Feature-based image metamorphosis," in *Computer Graphics (Proceedings of ACM SIGGRAPH 92)*, vol. 26(2), ACM, 35–42; Scott, K. et al., "Synthesis of speaker facial movement to match selected speech sequences," in *Proceedings of the Fifth Australian Conference on Speech Science and Technology*, vol. 2, 620–625 (1994); and Lee, S. Y. et al., "Image metamorphosis using snakes and free-form deformations," in Proceedings of SIGGRAPH 1995, ACM Press/ACM SIGGRAPH, vol. 29 of *Computer Graphics Proceedings, Annual Conference Series*, ACM, 439–448. When it is done by hand, however, this feature specification process may become quite tedious and complicated, especially in cases when a large amount of imagery is involved.

In the preferred embodiment of the invention, optical flow algorithms may be used to estimate this motion. See Horn, B. K. P. and B. G. Schunck, "Determining optical flow," *Artificial Intelligence* 17, 185–203, 1981; Barron, J. L. et al., "Performance of optical flow techniques," *International Journal of Computer Vision* 12(1), 43–47, 1994; and Bergen, J. et al., "Hierarchical model-based motion estimation," in *Proceedings of European Conference on Computer Vision*, 237–252, 1992. The motion is captured as a two-dimensional array of displacement vectors, in the same exact format shown in Equation 1. In particular, the coarse-to-fine, gradient-based optical flow algorithms of Bergen et al. (cited above) may be utilized. These algorithms compute the desired flow displacements using the spatial and temporal image derivatives. In addition, they embed the flow estimation procedure in a multiscale pyramidal framework (Burt, P. J. and E. H. Adelson, "The laplacian pyramid as a compact image code," *IEEE Trans. On Communications COM*-31, 4 (Apr.) 532–540 (1983)), where initial displacement estimates are obtained at coarse resolutions, and then propagated to high resolution levels of the pyramid.

Continuing with FIG. 4, an MMM may be constructed automatically from a recorded corpus 1002 of $\{I_j\}_{j=1}^S$ images. The two main tasks involved are to choose the image prototypes $\{I_i\}_{i=1}^N$ (step 4002), and to compute the correspondences $\{C_i\}_{i=1}^N$ between them (step 4004). Steps 4002 and 4004 to do this are discussed below. In one embodiment of the invention, the following operations are performed on the entire face region, while in another embodiment of the invention they may be performed only on the region around the mouth, or on some additional regions.

PCA (Step 4012)

For the purpose of more efficient processing, principal component analysis (PCA) is first performed in step 4012 on all images of the recorded video corpus 1002. PCA allows each image in the video corpus 1002 to be represented using a set of low-dimensional parameters. This set of low-dimensional parameters may thus be easily loaded into memory and processed efficiently in the subsequent clustering and Dijkstra steps 4014, 4004.

Performing PCA using classical autocovariance methods (Bishop, C. M., *Neural Networks for Pattern Recognition*, Clarendon Press, Oxford 1995), however, usually requires loading all the images and computing a very large autocovariance matrix, which requires a lot of memory. To avoid this, in one embodiment of the invention, an on-line PCA method may be adopted, termed EM-PCA (see Roweis, S. "EM algorithms for PCA and SPCA," in *Advances in Neural Information Processing Systems*, The MIT Press, M. I. Jordan, M. J. Kearns and S. A. Solla, Eds., Vol. 10, 1998) and Tipping, M. E. and C. M. Bishop, "Mixtures of probabilistic principal component analyzers," *Neural Computation* 11, 2, 443–482,1999). The EM-PCA allows PCA to be performed on the images in the corpus 1002 without loading them all into memory. EM-PCA is iterative, requiring several iterations, but is guaranteed to converge in the limit to the same principal components that would be extracted from the classical autocovariance method. The EM-PCA algorithm is typically run in one embodiment of the present invention for ten iterations.

Performing EM-PCA produces a set D of 624×472 principal components and a matrix Σ of eigenvalues. In the illustrative embodiment of the invention, D=15 PCA bases are retained. The images in the video corpus are subsequently projected on the principal components, and each image $I_j$ is represented with a D-dimensional parameter vector $p_j$.

K-Means Clustering (Step 4014)

Selection of the prototype images is performed in one embodiment of the invention in step 4014 using common k-means clustering. (See Bishop, C. M., *Neural Networks for Pattern Recognition*, Clarendon Press, Oxford 1995.) The clustering algorithm is applied directly on the $\{p_j\}_{j=1}^S$ low dimensional PCA parameters, producing N cluster centers. Typically the cluster centers extracted by k-means clustering do not coincide with actual image datapoints, so the nearest images in the dataset to the computed cluster centers are chosen to be the final image prototypes $\{I_i\}_{i=1}^N$ 4008 for use in the resulting MMM 1014.

It should be noted that K-means clustering requires the use of an internal distance metric with which to compare distances between datapoints and the chosen cluster centers. In the illustrative embodiment of the invention, since the image parameters are themselves produced by PCA, the appropriate distance metric between two points $p_m$ and $p_n$ is the Mahalanobis distance metric:

$$d(p_m, p_n) = (p_m - p_n)^T \Sigma^{-1} (p_m - p_n) \quad (2)$$

where Σ is the aforementioned matrix of eigenvalues extracted by the EM-PCA procedure.

In the illustrative embodiment of the invention, N=46 image prototypes 4008 have been selected. FIG. 3 shows 24 of the 46 image prototypes 4008. The top left image 3002a is the reference image $I_1$. Forty-six image prototypes is in keeping with the typical number of visemes used in other research, but the number of prototypes may be varied in different embodiments of the invention, as determined by one skilled in the art. It should be noted, however, that the 46 image prototypes 4008 have no explicit relationship to visemes, and instead form a simple basis set of image textures.

In another embodiment of the invention, a different selection mechanism for step 4002 may be used, such as, for example, a different clustering algorithm, or a heuristic-based mechanism for selection.

Dijkstra (Step 4004)

After the N=46 image prototypes 4008 are chosen, the next step 4004 in building an MMM is to compute correspondence between the reference image $I_1$ 3002a and all the other image prototypes 4008. In one embodiment of the invention, direct optical flow between the images may be computed, although direct application of optical flow may be incapable of estimating good correspondence when the underlying lip displacements between images 3002a, 4008 are greater than five pixels.

In another embodiment of the invention, flow concatenation may be used to overcome this problem. Since the original corpus 1002 is digitized at 29.97 fps, there are many intermediate frames that lie between the chosen prototypes 4008. A series of consecutive optical flow vectors between each intermediate image and its successor may be computed and concatenated into one large flow vector that defines the global transformation between the chosen prototypes 4008. Flow concatenation is discussed in more details in Appendix A.

In yet another embodiment of the invention, prototype images 4008 may be very far apart in the recorded visual corpus 1002, so it is not practical to compute concatenated optical flow between them. The repeated concatenation that would be involved across the hundreds or thousands of intermediate frames leads to a considerably degraded final flow.

To compute good correspondence between image prototypes 4008, a method is needed to figure out how to compute the path from the reference example $I_1$ to the chosen image prototypes $I_i$ without repeated concatenation over hundreds or thousands of intermediate frames. This may be accomplished by constructing the corpus graph representation of the corpus 1002 in step 4016. A corpus graph is an S-by-S sparse adjacency graph matrix in which each frame in the corpus 1002 is represented as a node in a graph connected to k nearest images. The k nearest images are chosen using the k-nearest neighbors algorithm (see C. M. Bishop cited above) and the distance metric used in the Mahalanobis distance in Equation 2 applied to the PCA parameters p. Thus, an image is connected in the graph to the k other images that look most similar to it. The edge-weight between a frame and its neighbor is the value of the Mahalanobis distance. In the illustrative embodiment of the invention, K=20 is used.

After the corpus graph is computed in step 4016 of FIG. 4, the Dijkstra shortest path algorithm (Cormen, T. H. et al., *Introduction to Algorithms*, The MIT Press and McGraw-Hill Book Company 1989; Tenenbaum, J. B. et al., "A global geometric framework for nonlinear dimensionality reduction," *Science* 290, December 1990, 2319–2323) is used in step 4018 to compute the shortest path between the reference example $I_1$ (e.g., 3002a in FIG. 3) and the other chosen image prototypes $I_i$ (4008 in FIGS. 3 and 4). Each shortest path produced by the Dijkstra algorithm is a list of images from the corpus 1002 that cumulatively represent the shortest deformation path from $I_1$ to $I_i$ as measured by the Mahalanobis distance. Concatenated flow from $I_1$ to $I_i$ is then computed along the intermediate images produced by the Dijkstra algorithm. Since there are 46 images, N=46 correspondences $\{C_i\}_{i=1}^N$ 4010 are computed in this fashion from the reference image $I_1$ to the other image prototypes $\{I_i\}_{i=1}^N$ 4008.

In an alternative embodiment of the invention, with a different corpus, a different search algorithm, such as, for example, breadth-first, may be used to compute the shortest path. Other techniques for computing correspondence are suitable.

Having built an MMM (stage 1006 of FIG. 1), synthesis 1020 and supporting analyses 1008 are described next.

Synthesis (Module 1020)

The goal of synthesis 1020 is to map from the multidimensional parameter space (α,β) to an image which lies at that position in MMM space. Synthesis 1020 is described in connection with FIG. 5. Since there are 46 correspondences 4010 (FIG. 4) in the illustrative embodiment of the invention, α is a 46-dimensional parameter vector that controls mouth shape. Similarly, since there are 46 image prototypes 4008 (FIG. 4), β is a 46-dimensional parameter vector that controls mouth texture. The total dimensionality of (α,β) is 92.

Synthesis 1020 first proceeds by synthesizing a new correspondence $C^{synth}$ using linear combination of the prototype flows $C_i$ (4010, FIG. 4):

$$C_1^{synth} = \sum_{i=1}^{N} \alpha_i C_i. \quad (3)$$

The subscript 1 in Equation 3 above is used to emphasize that $C_1^{synth}$ originates from the reference image $I_1$ (e.g., 3002a in FIG. 3) since all the prototype flows are taken with $I_1$ as reference.

Forward warping may be used to push the pixels of the reference image $I_1$ along the synthesized correspondence vector $C_1^{synth}$. Notationally, the forward warping operation may be denoted as an operator W(I,C) that operates on an image I and a correspondence map C (see Appendix B for details on forward warping).

Figure 5:
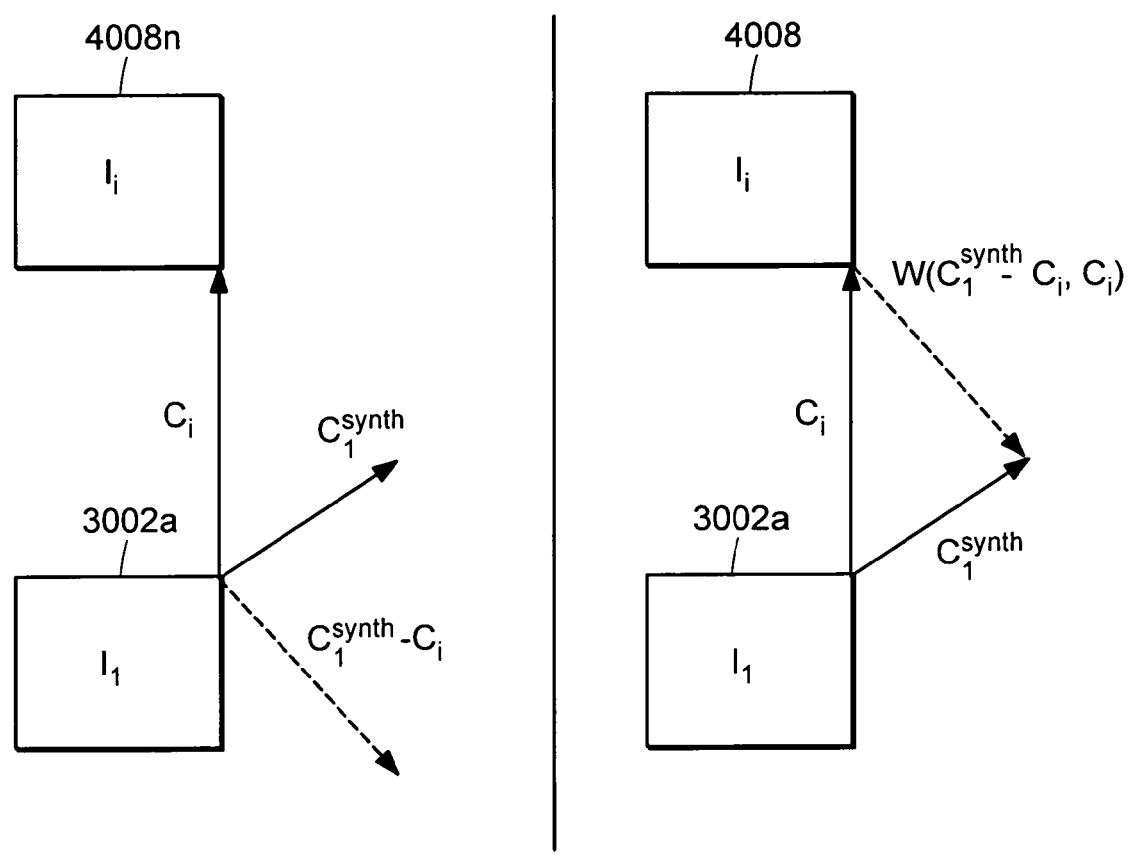
FIG. 5 is a schematic diagram of a flow reorientation process employed in the embodiment of FIG. 1.

However, a single forward warp will not utilize the image texture from all the examples. In order to take into account all image texture, a correspondence re-orientation procedure first described in Beymer et al. (Beymer, D. et al., "Example based image analysis and synthesis," *Tech. Rep.* 1431, MIT AI Lab 1993) is adopted that re-orients the synthesized correspondence vector $C_1^{synth}$ so that it originates from each of the other examples $I_i$ 4008 (FIG. 5). Re-orientation of the synthesized flow $C_1^{synth}$ proceeds in two steps, shown figuratively in FIG. 5. First $C_i$ is subtracted from the synthesized flow $C_1^{synth}$ to yield a flow that contains the correct flow geometry, but which originates from the reference example $I_1$ 3002a rather than the desired example image $I_i$ 4008n. Secondly, to move the flow into the correct reference frame, this flow vector is itself warped along $C_i$. The entire re-orientation process may be denoted as follows:

$$C_i^{synth} = W(C_1^{synth} - C_i, C_i). \quad (4)$$

Re-orientation is performed for all examples in the example set.

The third step in synthesis is to warp the prototype images $I_i$ 4008 along the re-oriented flows $C_i^{synth}$ to generate a set of N warped image textures $I_i^{warped}$:

$$I_i^{warped} = W(I_i, C_i^{synth}).$$

The fourth and final step is to blend the warped images $I^{warped}$ using the β parameters to yield the final morphed image:

$$I^{morph} = \sum_{i=1}^{N} \beta_i I_i^{warped}. \quad (6)$$

Combining Equations 3 through 6 together, the MMM synthesis 1026 (FIG. 1) may be written as follows:

$$I^{morph}(\alpha, \beta) = \sum_{i=1}^{N} \beta_i W\left(I_i, W\left(\sum_{j=1}^{N} \alpha_j C_j - C_i, C_i\right)\right). \quad (7)$$

Figure 6:
FIG. 6 illustrates original images from a corpus and corresponding synthetic images generated by the embodiment of FIG. 1.

Empirically, the MMM synthesis 1026 technique may be capable of realistic re-synthesis of lips, teeth and tongue. However, the blending of multiple images in the MMM for synthesis tends to blur out some of the finer details in the teeth and tongue (see Appendix C for a discussion of synthesis blur). Shown in FIG. 6 are some of the synthetic images 6020 produced by system 1000, along with their real counterparts (original corpus images) 6010 for comparison.

Analysis (Step 1008)

With reference to FIG. 1, the goal of analysis step 1008 is to project the entire recorded corpus $\{I_j\}_{j=1}^{S}$ 1002 onto the constructed MMM 1014, and produce a time series of $(\alpha^j, \beta_j)_{j=1}^{S}$ parameters that represent trajectories of the original mouth motion in MMM space.

One possible approach for analysis of images is to perform analysis-by-synthesis. See Jones M. and T. Poggio, "Multidimensional morphable models: A framework for representing and matching object classes," in *Proceedings of the International Conference on Computer Vision* (1998); and Blanz, V. and T. Vetter, "A morphable model for the synthesis of 3D faces," in *Proceedings of SIGGRAPH* 2001, *ACM Press/ACM SIGGRAPH*, Los Angeles, A. Rockwood, Ed., *Computer Graphics Proceedings, Annual Conference Series*, ACM 187–194 (1999). In this approach, the synthesis algorithm is used to synthesize an image $I^{synth}(\alpha,\beta)$, which is then compared to the novel image using an error metric (i.e., the L2 norm). Gradient-descent is then usually performed to change the parameters in order to minimize the error, and the synthesis process is repeated. The search ends when a local minimum is achieved. Analysis-by-synthesis, however, is very slow in the case when a large number of images are involved.

In the preferred embodiment of the invention, another method is chosen that is capable of extracting parameters (α,β) in one iteration. In addition to the image $I^{novel}$ to be analyzed, the method requires that the correspondence $C_{novel}$ from the reference image $I_1$ 3002a in the MMM 1014 to the novel image $I_{novel}$ be computed beforehand. In the illustrative embodiment of the invention, most of the novel imagery to be analyzed will be from the recorded video corpus 1002 itself, so the Dijkstra approach discussed in connection with FIG. 4 may be employed to compute good quality correspondences between the reference image $I_1$ and $I_{novel}$.

Given a novel image $I^{novel}$ and its associated correspondence $C^{novel}$, the first step of the analysis algorithm 1008 is to estimate the parameters α which minimize $$\left\| C^{novel} - \sum_{i=1}^{N} \alpha_i C_i \right\| \quad (8)$$

This is solved using the pseudo-inverse:

$$\alpha = (C^T C)^{-1} C^T C^{novel} \quad (9)$$

where C above is a matrix containing all the prototype correspondences $\{C_i\}_{i=1}^{N}$ 4010 (FIG. 4).

After the parameters α are estimated, N image warps may be synthesized in the same manner as described above using flow-reorientation and warping:

$$I_i^{warp} = W\left(I_i, W\left(\sum_{i=1}^{N} \alpha_i C_i - C_i, C_i\right)\right) \quad (10)$$

The final step in analysis 1008 is to estimate the values of β as the values which minimize $$\|I^{novel} \Sigma_{i=1}^{N} \beta_i I_i^{warp}\| \text{ subject to } \beta_i > 0 \forall i \text{ and } \Sigma_{i=1}^{N} \beta_i = 1 \quad (11)$$

Figure 7A:
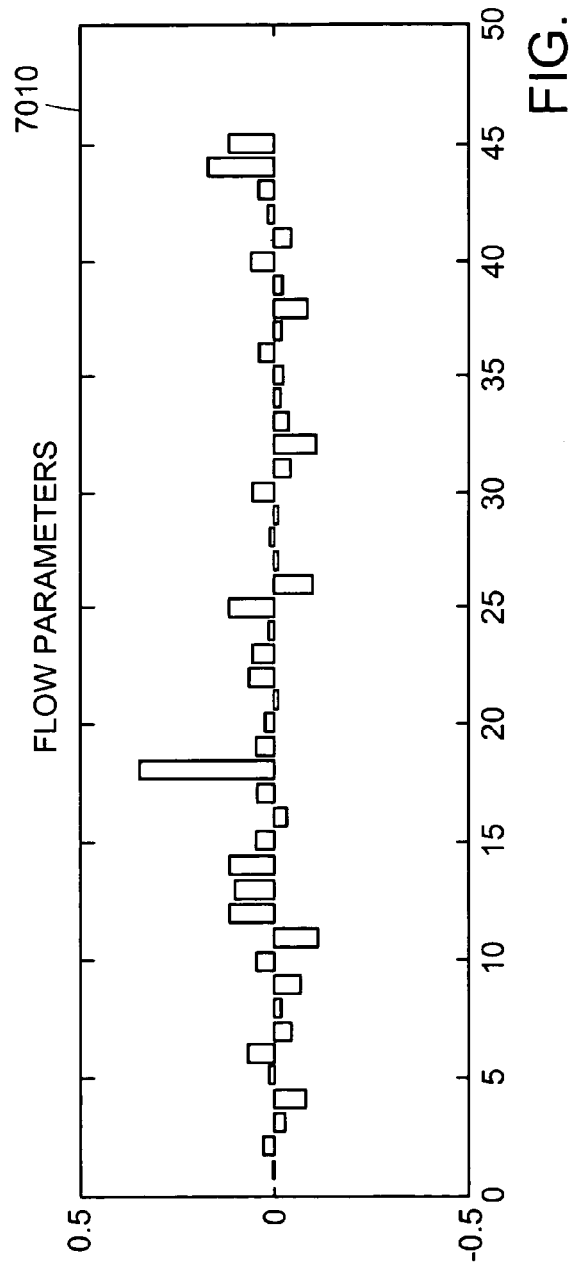
FIGS. 7a and 7b are graphs of flow parameters ($\alpha_1$) values and corresponding texture parameters ($\beta_1$) values, respectively, computed for one image in the embodiment of FIG. 1.
Figure 7B:
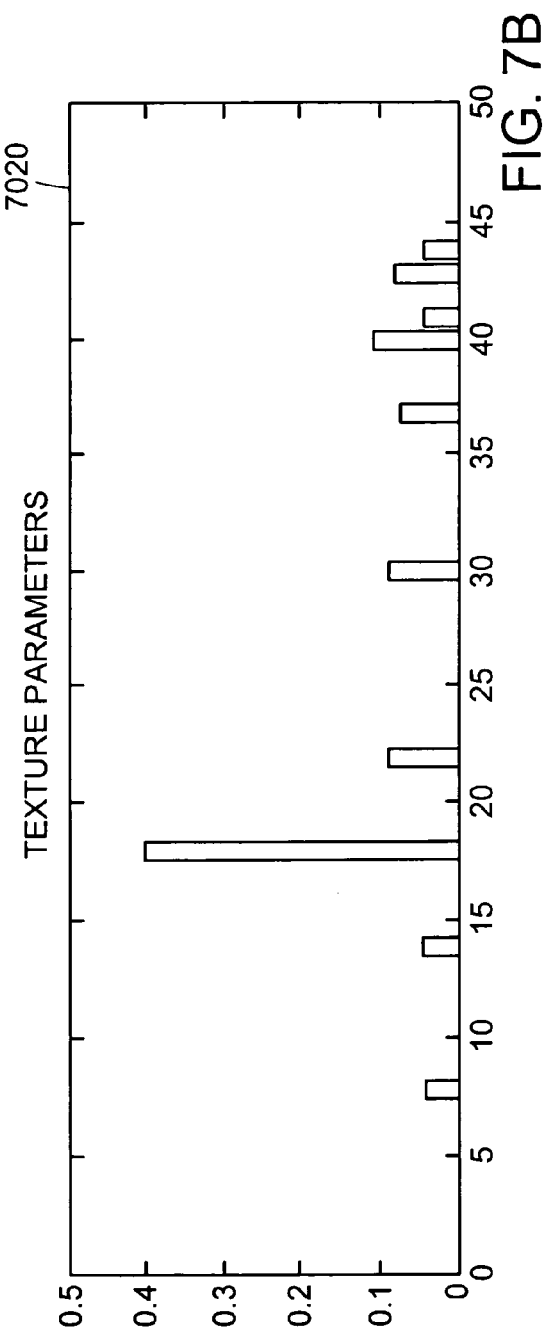

The non-negativity constraint above on the $\beta_i$ parameters ensures that pixel values are not negated. The normalization constraint ensures that the $\beta_i$ parameters are computed in a normalized manner for each frame, which prevents brightness flickering during synthesis. The form of the imposed constraints cause the computed $\beta_i$ parameters to be sparse (see FIG. 7), which enables efficient synthesis by requiring only a few image warps (instead of the complete set of 46 warps). In FIG. 7 the graph 7010 illustrates analyzed $\alpha_i$ flow parameters computed for one image prototype 4008. The bottom graph 7020 illustrates the corresponding analyzed $\beta_i$ texture parameters computed for the same image. The $\beta_i$ texture parameters are typically zero for all but a few image prototypes 4008.

Equation 11, which involves the minimization of a quadratic cost function subject to constraints, is solved using quadric programming methods. In one embodiment of the invention, the Matlab function quadprog is used, but the computation may be performed using any tools deemed appropriate by one skilled in the art.

Each utterance in the corpus 1002 is analyzed with respect to the 92-dimensional MMM 1014, yielding a set of $z_t = (\alpha_t, \beta_t)$ parameters for each utterance. This analysis 1008 of the corpus in the illustrative embodiment takes on the order of 15 seconds per frame on circa 1998 450 MHz Pentium II machine. Shown in FIG. 9 in solid line are example analyzed trajectories 9012 and 9022 for $\alpha_{12}$ and $\beta_{28}$, respectively, computed for the word "tabloid". In top graph 9010 of FIG. 9, a comparison may be viewed of the analyzed trajectory for $\alpha_{12}$ (solid line 9012), the synthesized trajectory for $\alpha_{12}$ before training (dotted line 9014) and the synthesized trajectory for $\alpha_{12}$ after training (line formed of crosses 9016). Bottom graph 9020 of FIG. 9 shows the analyzed trajectory for $\beta_{28}$ (solid line 9022), the synthesized trajectory for $\beta_{28}$ before training (dotted line 9024) and the synthesized trajectory for $\beta_{28}$ after training (line of crosses 9026).

Trajectory Synthesis (Step 1024)

The goal of trajectory synthesis 1024 (FIG. 1) is to map from an input phone stream $\{P_t\}$ 1022 to a trajectory $y_t = (\alpha_t, \beta_t)$ of parameters in MMM space. After the parameters are synthesized, Equation 7 above (i.e., MMM synthesis 1026) may be used to create a final visual stream that represents the recorded subject of corpus 1002 mouthing the new utterances (not previously recorded) of the input stream 1022 in a quality liken to a video recording of a talking face.

The phone stream 1022 is a stream of phonemes $\{P_t\}$ representing the phonetic transcription of the utterance. For example, the word "one" may be represented by a phone stream $\{P_t\} = $(\w\, \w\, \w\, \w\, \uh\, \uh\, \uh\, \uh\, \uh\, \uh\, \n\, \n\, \n\, \n\, \n\). Each element in the phone stream represents one image frame. T may be defined to be the length of the entire utterance in frames.

Since the audio (input phone stream 1022) is aligned, it is possible to examine all the flow α and texture β parameters for any particular phoneme. Shown in FIG. 8 are histograms for the $\alpha_1$ parameter for the ∴w\, \m\, \aa\ and \ow\phonemes. Evaluation of the analyzed parameters from the corpus 1002 reveals that parameters representing the same phoneme tend to cluster in MMM space. In the preferred embodiment of the invention, each phoneme p is mathematically represented as a multidimensional Gaussian with mean $\mu_p$ and diagonal covariance $\Sigma_p$. Separate means and covariances are estimated for the flow and texture parameters. In another embodiment of the invention, since the β texture parameters are non-negative, they may be modeled using Gamma distributions not Gaussians. In that case, Equation 12 is rewritten for Gamma distributions. In the preferred embodiment of the invention, Gaussians work well enough for P texture parameters.

The trajectory synthesis problem (step 1024, FIG. 1) is framed mathematically as a regularization problem. See Girosi F. et al., "Priors, stablizers, and basis functions: From regularization to radial, tensor, and additive splines, *Tech. Rep.* 1430, MIT AI Lab, June (1993); and Wahba, G., "Splines Models for Observational Data," Series in *Applied Mathematics*, Vol. 59, SIAM, Philadelphia (1990). The goal is to synthesize a trajectory y which minimizes an objective function E consisting of a target term and a smoothness term:

$$E = \underbrace{(y-\mu)^T D^T \Sigma^{-1} D(y-\mu)}_{\text{target term}} + \lambda \underbrace{y^T W^T W y}_{\text{smoothness}} \quad (12)$$

The desired trajectory y is a vertical concatenation of the individual $y_t = \alpha_t$, terms at each time step (or $y_t = \beta_t$, since in the preferred embodiment of the invention, α flow and β texture parameters are treated separately):

$$y = \begin{bmatrix} y_t \\ \vdots \\ y_T \end{bmatrix} \quad (13)$$

The target term consists of the relevant means μ and covariances Σ constructed from the phone stream 1022:

$$\mu = \begin{bmatrix} \mu_{P_t} \\ \vdots \\ \mu_{P_T} \end{bmatrix}, \Sigma = \begin{bmatrix} \Sigma_{P_t} & & \\ & \ddots & \\ & & \Sigma_{P_T} \end{bmatrix} \quad (14)$$

The matrix D is a duration-weighting matrix which emphasizes the shorter phonemes and de-emphasizes the longer ones, so that the objective function is not heavily skewed by the phonemes of longer duration:

$$D = \begin{bmatrix} \sqrt{I - \frac{D_{P_1}}{T}} & & & \\ & \sqrt{I - \frac{D_{P_2}}{T}} & & \\ & & \ddots & \\ & & & \sqrt{I - \frac{D_{P_T}}{T}} \end{bmatrix} \quad (15)$$

One possible smoothness term consists of the first order difference operator:

$$W = \begin{bmatrix} -II & & & \\ & -II & & \\ & & \ddots & \\ & & & -II \end{bmatrix} \quad (16)$$

Higher orders of smoothness are formed by repeatedly multiplying W with itself: second order $W^T W_T WW$, third order $W^T W_T W^T WWW$, and so on.

Finally, the regularizer $\lambda$ determines the tradeoff between both terms e.g., target and smoothness.

Taking the derivative of Equation 12 and minimizing yields the following equation for synthesis:

$$(D^T \Sigma^{-D} + \lambda W^T W)_y = D^T \Sigma^{-1} D\mu \quad (17)$$

Given known means $\mu$, covariances $\Sigma$, and regularizer $\lambda$, synthesis is simply a matter of plugging the known values into Equation 17 and solving for y using Gaussian elimination. This is done separately for the $\alpha$ flow and the $\beta$ texture parameters. In one embodiment of the invention, a regularizer of degree four yielding multivariate additive quintic splines gave satisfactory results.

Co-articulation effects in the preferred embodiment of the invention are modeled via the magnitude of the variance $\Sigma_p$ for each phoneme. Small variance means the trajectory must pass through that region in phoneme space, and hence neighboring phonemes have little co-articulatory effect. On the other hand, large variance means the trajectory has a lot of flexibility in choosing a path through a particular phonetic region, and hence it may choose to pass through regions which are closer to a phoneme's neighbor. The phoneme will thus experience large co-articulatory effects.

There is no explicit model of phonetic dynamics in the preferred embodiment of the invention. Instead, phonetic dynamics emerge implicitly through the interplay between the magnitude of the variance $\Sigma_P$ for each phoneme (which determines the phoneme's "spatial" extent), and the input phone stream 1022 (which determines the duration in time of each phoneme). Equation 12 then determines the speed through a phonetic region in a manner that balances nearness to the phoneme with smoothness of the overall trajectory. In general, the trajectories may speed up in regions of small duration and small variance (i.e., plosives), while they may slow down in regions of large duration and large variance (i.e., silences).

Training

The means $\mu_p$ and covariances $\Sigma_p$ for each phoneme p are initialized directly from the data using sample means and covariances. However, the sample estimates tend to average out the mouth movement so that it looks under-articulated. As a consequence, there is a need to adjust the means and variances to better reflect the training data.

Gradient descent learning may be employed to adjust the mean $\mu$ and covariances $\Sigma$. First, the Euclidean error metric is chosen to represent the error between the original utterance z and the synthetic utterance y:

$$E = (z-y)^T (z\,'y) \quad (18)$$

The parameters $\{\mu_p, \Sigma_p\}$ need to be changed to minimize this objective function E. The chain rule may be used to derive the relationship between E and the parameters:

$$\frac{\partial E}{\partial \mu_i} = \left(\frac{\partial E}{\partial y}\right)^T \left(\frac{\partial y}{\partial \mu_i}\right) \quad (19)$$

$$\frac{\partial R}{\partial \sigma_{ij}} = \left(\frac{\partial E}{\partial y}\right)^T \left(\frac{\partial y}{\partial \sigma_{ij}}\right) \quad (20)$$

$$\frac{\partial E}{\partial y}$$

may be obtained from Equation 18:

$$\frac{\partial E}{\partial y} = -2(z-y) \quad (21)$$

Since y is defined according to Equation 17, its derivative may be taken to compute $$\frac{\partial y}{\partial \mu_i}$$

and $$\frac{\partial y}{\partial \sigma_{ij}}:$$

$$(D^T \Sigma^{-1} D + \lambda W^T W)\frac{\partial y}{\partial \mu_i} = D^T \Sigma^{-1} D \frac{\partial \mu}{\partial \mu_i} \quad (22)$$

$$(D^T \Sigma^{-1} D + \lambda W^T W)\frac{\partial y}{\partial \sigma_{ij}} = 2D^T \Sigma^{-1} \frac{\partial \Sigma}{\partial \sigma_{ij}} \Sigma^{-1} D(y-\mu) \quad (23)$$

Finally, gradient descent is performed by changing the previous values of the parameters according to the computed gradient:

$$\mu^{new} = \mu^{old} - \eta \frac{\partial E}{\partial \mu} \quad (24)$$

$$\Sigma^{new} = \Sigma^{old} - \eta \frac{\partial E}{\partial \Sigma} \quad (25)$$

Cross-validation sessions may be performed in some embodiments of the invention to evaluate the appropriate value of $\lambda$ and the correct level of smoothness W to use. In one embodiment, the learning rate $\eta$ was set to 0.00001 for all trials, and 10 iterations performed. A comparison between batch and online updates indicated that online updates perform better, so this method was used throughout training in the one embodiment. Further testing was performed on a set composed of 1-syllable words, 2-syllable words and sentences not contained in the training set. The Euclidean norm between the synthesized trajectories and the original trajectories was used to measure error. The results showed that the optimal smoothness operator is fourth order and the optimal regularizer is $\lambda=1000$. FIG. 9 depicts synthesized trajectories for the $\alpha_{12}$ and $\beta_{28}$ parameters before training (9014 and 9024) and after training (9016 and 9026) for these optimal values of W and $\lambda$.

Post-Processing (Step 1028)

Due to the head and eye normalization that was performed during the pre-processing stage 1004, the final animations 10030 generated by system 1000 exhibit movement only in the mouth region. This leads to an unnerving "zombie"-like quality to the final animations 10030. In the preferred embodiment this issue may be addressed by compositing the synthesized mouth onto a background sequence that contains natural head and eye movement.

The first step in the composition process is to add Gaussian noise to the synthesized images to regain the camera image sensing noise that is lost as a result of blending multiple image prototypes 4008 in the MMM 1014. In one embodiment of the invention, means and variances for this noise may be estimated by computing differences between original images 1002 and images synthesized by system 1000, and averaging over 200 images.

After noise is added, the synthesized sequences are composited onto the chosen background sequence with the help of the masks 2002, 2004, 2006, 2008 shown in FIG. 2*b*. Background mask 2006 defines the area of the chosen background sequence to use for the synthesized images. The head mask 2002 is first forward warped using optical flow to fit across the head of each image of the background sequence. Next, optical flow is computed between each background image and its corresponding synthetic image. The synthetic image and the mouth mask 2004 from FIG. 2*b* are then perspective-warped back onto the background image. The perspective warp is estimated using only the flow vectors lying within the background head mask 2006. The final composite 10030 is made by pasting the warped mouth onto the background image using the warped mouth mask. The mouth mask is smoothed at the edges to perform a seamless blend between the background image and the synthesized mouth. The compositing process is depicted in FIG. 10.

Figure 10:
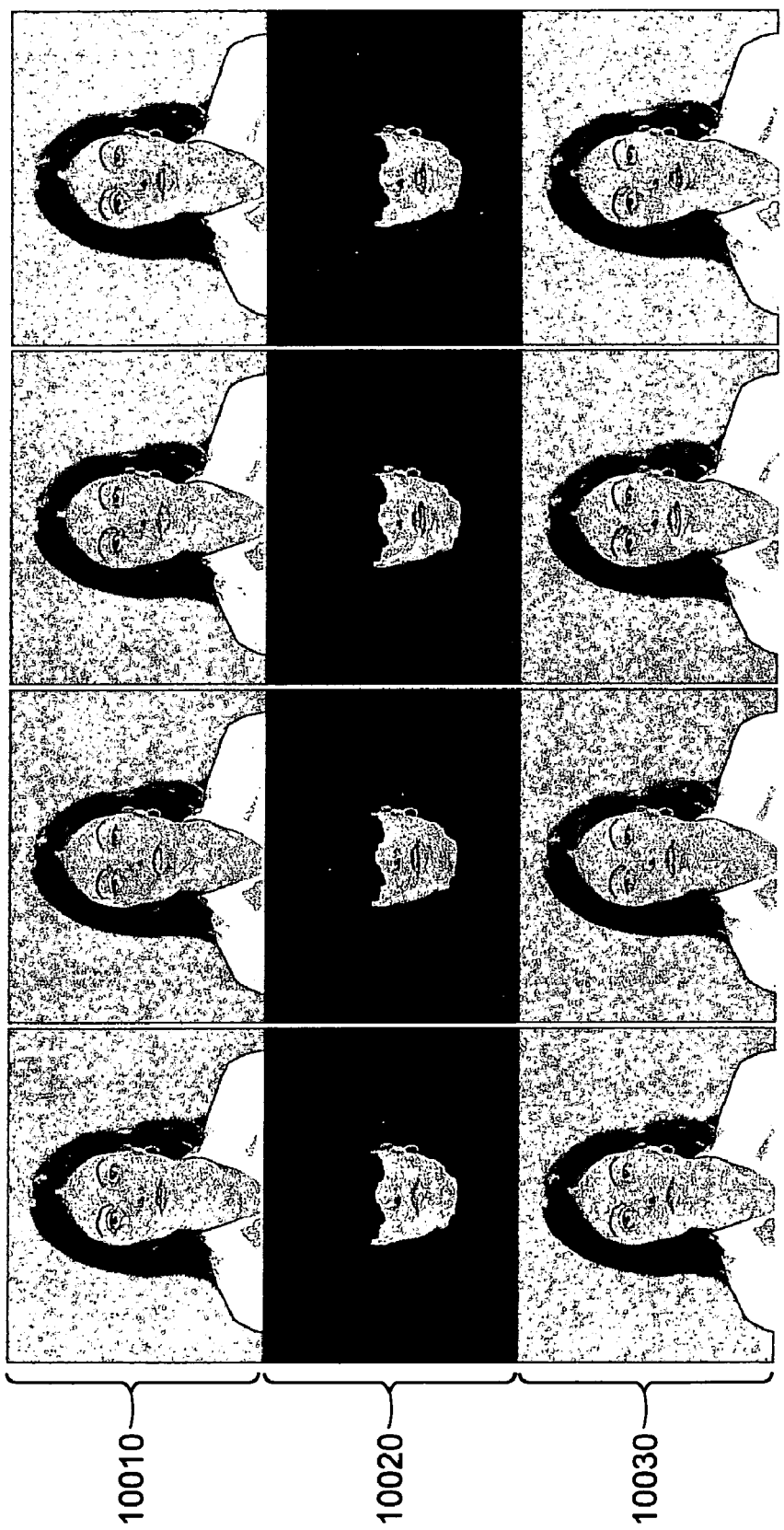
FIG. 10 illustrates a background compositing process which employs the masks of FIG. 2b.

A background sequence 10010 with natural head and eye movement is depicted in the top row of FIG. 10. Next a sequence 10020 of the synthesized images with desired mouth movement and appropriate masking is provided. The final composite sequence 10030 has the desired mouth movement (from synthesized images by system 1000) but with the natural head and eye movements of the background sequence 10010.

Computational Issues

According to the foregoing, use of the invention system 1000 is as follows. An animator first provides phonetically annotated audio 1022. The annotation may be done automatically (Huang et al. cited above), semi-automatically using a text transcript (Huang et al.) or manually (Sjlander, K. and J. Beskow, "Wavesurfer—an open source speech tool," in *Proc. of ICSLP, vol.* 4, 464–467 (2000)).

Trajectory synthesis 1024 is performed by Equation 17 using the trained phonetic models 1012. This is done separately for the $\alpha$ flow and $\beta$ texture parameters. After the parameters $(\alpha, \beta)$ are synthesized, Equation 7 (MMM synthesis 1026) is used to create the visual stream (sequence of synthesized images) 10030 with the desired mouth movement. Typically only the image prototypes $I_i$ which are associated with top 10 values of $\beta_i$ are warped, which yields a considerable savings in computation time. MMM synthesis 1026 takes on the order of about 7 seconds per frame for an image resolution of 624×472. The background compositing process 1028 adds on a few extra seconds of processing time. All times are computed on a 450 MHz Pentium II.

APPENDIX A

Flow Concatenation

Given a series of consecutive images $I_0, I_1, \ldots I_n$, the correspondence map $C_{0(n)}$ relating $I_0$ to $I_n$ may be constructed. The case of three images $I_{i-1}, I_i, I_{i+1}$ is the focus in the illustrative embodiment, since the concatenation algorithm is simply an iterative application of this 3-frame base case. Optical flow is first computed between the consecutive frames to yield $C_{(i-1)i}$, $C_{i(i+1)}$. Note that it is not correct to construct $C_{(i-1)(i+1)}$ as the simple addition of $C_{(i-1)i} + C_{i(i+1)}$ because the two flow fields are with respect to two different reference images. Vector addition needs to be performed with respect to a common origin.

Concatenation thus proceeds in two steps: to place all vector fields in the same reference frame, the correspondence map $C_{i(i+1)}$ itself is warped backwards along $C_{(i-1)i}$ to create $C_{i(i+1)}^{warped}$. Now $C_{i(i+1)}^{warped}$ and $C_{(i-1)i}$ are both added to produce an approximation of the desired concatenated correspondence:

$$C_{(i-1)(i+1)} = C_{(i-1)i} + C_{(i+1)}^{warped} \qquad (26)$$

A procedural version of backward warp is given below. Binlinear refers to bilinear interpolation of the four pixel values closest to the point (x,y).

Backward warp routine
for j=0 . . . height,
for i -=0 . . . width,
  x=i+dx(i,j);
  y=j+dx(i,j);
  $I^{warped}$(i,j)=BILINEAR (I, x, y;)

APPENDIX B

Forward Warping

Forward warping may be viewed as "pushing' the pixels of an image I along the computed flow vectors C. The forward warping operation may be denoted as an operator W(I,C) that operates on an image I and a correspondence map C, producing a warped image $I^{warped}$ as final output. A procedural version of forward warp is as follows:

Forward Warp Routine
For j=0 . . . height
  For i=0 . . . width
    x=ROUND (i+$\alpha$dx(i,j));
    y=ROUND (j+$\alpha$dy(i,j));
    if (x,y) are within the image
      $I^{warped}$(x,y)=I(i,j);

It is also possible to forward warp a corresondence map C' along another correspondence C, which may be denoted as W(C',C). In this scenario, the x and y components of C'(p)={d'x(p),d$_y$'(p)} are treated as separate images, and warped individually along C:W(dx',C) and W(dy',C).

APPENDIX C

Hole-Filling

Forward warping produces black holes which occur in cases where a destination pixel was not filled in with any source pixel value. This occurs due to inherent nonzero divergence in the optical flow, particularly around the region where the mouth is expanding. To remedy this, a hole-filling algorithm (Chen, S. E. and L. Williams, "View interpolation for image synthesis", in *Proceedings of SIGGRAPH* 1993, ACM Press/ACM SIGGRAPH, Anaheim, Cal., *Computer Graphics Proceedings, Annual Conference Series*, ACM, 279–288) was adopted in the preferred embodiment, which pre-fills a destination image with a special reserved background color. After warping, the destination image is traversed in rasterized order and the holes are filled in by interpolating linearly between their non-hole endpoints.

In the context of synthesis module 1020 described in connection with FIG. 5, hole-filling can be performed before blending or after blending. In one embodiment of the invention, hole-filling is performed before blending, which allows for subsuming the hole-filling procedure into the forward warp operator W and simplifies the notation. Consequently, (as in Equation 6), the blending operation becomes a simple linear combination of the hole-filled warped intermediates $I_i^{warped}$.

In the preferred embodiment, however, hole-filling is performed after blending, which reduces the size of the holes that need to be filled, and leads to a considerable reduction in synthesizer blur. Post-blending hole-filling requires a more complex blending algorithm than as noted in Equation 6 because the blending algorithm now needs to keep track of holes and non-holes in the warped intermediate images $I_i^{warped}$:

$$I^{morph}(x, y) = \frac{\sum_{I_i} warped_{(x,y) \neq hole} \beta_i I_i^{warped}(x, y)}{\sum_{I_i} warped_{(x,y) \neq hole} \beta_i} \quad (27)$$

Typically an accumulator array is used to keep track of the denominator term in Equation 27 above. The synthesized mouth images 6020 shown in FIG. 7 were generated using post-blending hole-filling.

While this invention has been particularly shown and described with references to preferred embodiments thereof, it will be understood by those skilled in the art that various changes in form and details may be made therein without departing from the scope of the invention encompassed by the appended claims.

For example, applicants have found that reducing the number of image prototypes 4008 below 30 degrades the quality of the final animations (video sequences 10030). An open question is whether increasing the number of prototypes 4008 significantly beyond 46 will lead to even higher levels of videorealism.

In terms of corpus 1002 size, it is possible to optimize the spoken corpus so that several words alone elicit the 46 prototypes 4008. This would reduce the duration of the corpus 1002 from 15 minutes to a few seconds. However, this would degrade the quality of the correspondences 4010 computed by the Dijkstra algorithm 4004. In addition, the phonetic training performed by the trajectory synthesis module 1024 would degrade as well.

In another example, the design of system 1000 may likewise be used to synthesize audio for a given video input into synthesis module 1020. In that case, trajectory synthesis 1024 is performed using trained visual/video models (instead of phonetic models 1012). The trajectory synthesis maps from the input video stream to a trajectory of parameters (that represent original audio sounds) in MMM space. This is accomplished using a modified Equation 17. Equation 17 is modified for sound units, e.g. phonemes or phones P instead of images I with appropriate α and β parameters representing audio characteristics in the audio prototypes in MMM 1014. The MMM here is capable of morphing between a small set of prototype audio phones to synthesize new, previously unheard audio sound configurations. After the parameters are synthesized, Equation 7 (modified for sound units, e.g. phonemes P instead of images I) is used to create the audio or speech stream with desired audio (synthesized sound).

Further, it is understood that the components illustrated in FIG. 1 may be implemented by various computer architectures (client-server design, distributed networks of a local area/global, etc. network, a stand-alone system, etc.) in various hardware, software or combination configurations (including computer program products, integrated systems and the like). The foregoing figures and corresponding discussion is for purposes of illustration and not limitation.

What is claimed is:

1. Computer method for generating a videorealistic audio-visual animation of a subject comprising the computer implemented steps of:
   (a) receiving video recorded data of a subject including sound data of the subject enunciating certain speech and image data of the subject posing certain facial configurations;
   (b) forming a multidimensional model based on the video recorded data, said model synthesizing at least images of new facial configurations, wherein for synthesizing images of new facial configurations, the model employs morphing according to mouth parameters;
   (c) for a given target speech stream or a given target image stream, mapping from the target stream to a trajectory of parameters in the model, the trajectory of parameters enabling the model to generate at least one of (1) synthesized images of new facial configurations of the subject for the target stream and (2) synthesized speech sound of new speech of the subject for the target stream, wherein for synthesizing images of new facial configurations, the model uses the trajectory of parameters to smoothly morph between a subset of images of the certain facial configurations of the video recorded data; and
   (d) rendering video images and speech sound from the synthesized images of new facial configurations of the subject and the target stream, such that a videorealistic audio-visual animation of the subject is produced.

2. The computer method of claim 1 wherein:
   the model employing morphing according to mouth parameters includes a mouth shape parameter α and a mouth appearance parameter β; and
   the step of forming the multidimensional model includes:
   for each image of a subset of images from the image data of the video recorded data, computing optical flow vectors C from the image to every other image in the subset;
   computing a mouth shape parameter α value and a mouth appearance parameter β value for each image of the subset; and
   based on the computed mouth shape parameter α values and computed mouth appearance parameter β values, forming Gaussian clusters for respective phonemes, each Gaussian cluster having a means μ and diagonal covariance Σ for mathematically representing the respective phoneme, such that (i) given a target set of α, β values, the model produces a morph image of the subject having a mouth with a mouth shape and mouth appearance configuration corresponding to the target α, β values, and (ii) given a target mouth image, the model computes α, β values that represent the target mouth image with respect to the images in the subset.

3. The computer method as claimed in claim 2 wherein given a target α, β, the model produces a morph image I according to $$I^{morph}(\alpha, \beta) = \sum_{i=1}^{N} \beta_i W\left(I_i, W\left(\sum_{j=1}^{N} \alpha_j C_j - C_i, C_i\right)\right)$$

where W is a forward warping operator.

4. A computer method as claimed in claim 2 wherein given a target speech stream, the step of mapping employs the relationship $(D^T\Sigma^{-1}D+\lambda W^T W)_y = D^T\Sigma^{-1}D\mu$ to generate a trajectory y having T (α, β) parameter values; and from the generated trajectory of α, β parameter values, the model produces a set of morph images of the subject corresponding to the target speech stream;
where $$D = \begin{bmatrix} \sqrt{1 - \frac{D_{P_1}}{T}} & & & \\ & \sqrt{1 - \frac{D_{P_2}}{T}} & & \\ & & \ddots & \\ & & & \sqrt{1 - \frac{D_{P_T}}{T}} \end{bmatrix}$$

λ is a regularizer; and $$W = \begin{bmatrix} -II & & & \\ & -II & & \\ & & \ddots & \\ & & & -II \end{bmatrix}$$

5. The computer method as claimed in claim 2 further comprising the step of adjusting means μ and covariances Σ using gradient descent learning.

6. The computer method as claimed in claim 1 wherein the step of mapping further includes employing mathematical regularization to generate the trajectory of parameters.

7. The computer method as claimed in claim 6 wherein the regularization includes a smoothness term.

8. Computer apparatus for generating videorealistic audio-visual animation of a subject comprising:
(a) a member for receiving video recorded data of a subject including sound data of the subject enunciating certain speech and image data of the subject posing certain facial configurations;
(b) a model building mechanism for forming a multidimensional model based on the video recorded data, said model for synthesizing at least images of new facial configurations, wherein for synthesizing images of new facial configurations, the model employs morphing according to mouth parameters; and
(c) a synthesis module responsive to a given target speech stream or a given target image speech stream, the synthesis module mapping from the target stream to a trajectory of parameters in the formed model, the trajectory of parameters enabling the model to generate at least one of (1) synthesized images of new facial configurations of the subject for the target stream and (2) synthesized speech sound of new speech of the subject for the target stream, wherein for synthesizing images of new facial configurations, the model uses the trajectory of parameters to smoothly morph between a subset of images of the certain facial configurations of the video recorded data, the synthesis module rendering audio-video images and speech sound from the synthesized images of new facial configurations of the subject and the target stream, such that a videorealistic audio-visual animation of the subject is produced.

9. The computer apparatus of claim 8 wherein:
the mouth parameters include a mouth shape parameter α and a mouth appearance parameter β; and
the model building mechanism forms the multidimensional model by:
for each image of a subset of images from the image data of the video recorded data, computing optical flow vectors C from the image to every other image in the subset;
computing a mouth shape parameter value α and a mouth appearance parameter value β for each image of the subset; and
based on the computed mouth shape parameter α values and the computed mouth appearance parameter β values, forming Gaussian clusters for respective phonemes, each Gaussian cluster having a means μ and diagonal covariance Σ for mathematically representing the respective phoneme,
such that (i) given a target set of α,β values, the model produces a morph image of the subject having a mouth with a mouth shape and mouth appearance configuration corresponding to the target α,β values, and (ii) given a target mouth image, the model computes α,β values that represent the target mouth image with respect to the images in the subset.

10. The computer apparatus as claimed in claim 9 wherein given a target α,β, the model produces a morph image I according to $$I^{morph}(\alpha, \beta) = \sum_{i=1}^{N} \beta_i W\left(I_i, W\left(\sum_{j=1}^{N} \alpha_j C_j - C_i, C_i\right)\right)$$

where W is a forward warping operator.

11. The computer apparatus as claimed in claim 9 wherein given a target speech stream, the synthesis module employs the relationship $$(D^T\Sigma^{-1}D+\lambda W^T W)_y = D^T\Sigma^{-1}D\mu$$

to generate a trajectory y having T (α,β) parameter values; and
from the generated trajectory of α,β parameter values, the model produces a set of morph images of the subject corresponding to the target speech stream;
where D is a duration-weighting matrix
λ is a regularizer; and
W is a first order difference operator.

12. The computer apparatus as claimed in claim 9 wherein the model building mechanism adjusts means $\mu$ and covariances $\Sigma$ using gradient descent learning.

13. The computer apparatus as claimed in claim 8 wherein the synthesis module employs mathematical regularization to generate the trajectory of parameters.

14. The computer apparatus as claimed in claim 13 wherein the regularization includes a smoothness term.

15. A computer system for generating audio-visual animation of a subject, comprising:
   a source of video recorded data of a subject including sound data of the subject enunciating certain speech and image data of the subject posing certain facial configurations;
   multidimensional modeling means based on the video recorded data, said modeling means synthesizing at least images of new facial configurations, wherein for synthesizing images of new facial configurations, the modeling means employs morphing according to mouth parameters;
   a synthesis module responsive to a given target stream and using the modeling means mapping from the target stream to a trajectory of parameters in the modeling means, the trajectory of parameters enabling the modeling means to generate at least one of (1) synthesized images of new facial configurations of the subject for the target stream and (2) synthesized speech sound of new speech of the subject for the target stream, wherein for synthesizing images of new facial configurations, the modeling means uses the trajectory of parameters to smoothly morph between a subset of images of the certain facial configurations of the video recorded data, and therefrom the synthesis module rendering video images and speech sound from the synthesized images of new facial configurations of the subject and the target stream, such that a videorealistic audio-visual animation of the subject is produced.

16. A computer system as claimed in claim 15 wherein the mouth parameters include a mouth shape parameter and a mouth appearance parameter.

17. A computer system as claimed in claim 15 wherein the synthesis module further employs mathematical regularization to generate the trajectory of parameters.

18. A computer system as claimed in claim 17 wherein the regularization includes a smoothness term.

19. Computer method for generating a videorealistic audio-visual animation of a subject comprising the computer implemented steps of:
   (a) receiving video recorded data of a subject including sound data of the subject enunciating certain speech and image data of the subject posing certain facial configurations;
   (b) forming a multidimensional model based on the video recorded data, said model synthesizing at least images of new facial configurations, wherein for synthesizing images of new facial configurations, the model employs morphing according to mouth parameters;
   (c) for a given target speech stream or a given target image stream, mapping from the target stream to a trajectory of parameters in the model, the trajectory of parameters enabling the model to generate at least one of (1) synthesized images of new facial configurations of the subject for the target stream and (2) synthesized speech sound of new speech of the subject for the target stream, wherein for synthesizing images of new facial configurations, the model uses the trajectory of parameters to smoothly morph between a subset of images of the certain facial configurations of the video recorded data;
   (d) rendering video images and speech sound from the synthesized images of new facial configurations of the subject and the target stream, such that a videorealistic audio-visual animation of the subject is produced;
   the model employing morphing according to mouth parameters includes a mouth shape parameter $\alpha$ and a mouth appearance parameter $\beta$; and
   the step of forming the multidimensional model includes:
      for each image of a subset of images from the image data of the video recorded data, computing optical flow vectors C from the image to every other image in the subset;
      computing a mouth shape parameter $\alpha$ value and a mouth appearance parameter $\beta$ value for each image of the subset; and
      based on the computed mouth shape parameter $\alpha$ values and computed mouth appearance parameter $\beta$ values, forming Gaussian clusters for respective phonemes, each Gaussian cluster having a means $\mu$ and diagonal covariance $\Sigma$ for mathematically representing the respective phoneme,
      such that (i) given a target set of $\alpha$, $\beta$ values, the model produces a morph image of the subject having a mouth with a mouth shape and mouth appearance configuration corresponding to the target $\alpha$, $\beta$ values, and (ii) given a target mouth image, the model computes $\alpha$, $\beta$ values that represent the target mouth image with respect to the images in the subset.

20. Computer apparatus for generating videorealistic audio-visual animation of a subject comprising:
   (a) a member for receiving video recorded data of a subject including sound data of the subject enunciating certain speech and image data of the subject posing certain facial configurations;
   (b) a model building mechanism for forming a multidimensional model based on the video recorded data, said model for synthesizing at least images of new facial configurations, wherein for synthesizing images of new facial configurations, the model employs morphing according to mouth parameters;
   (c) a synthesis module responsive to a given target speech stream or a given target image speech stream, the synthesis module mapping from the target stream to a trajectory of parameters in the formed model, the trajectory of parameters enabling the model to generate at least one of (1) synthesized images of new facial configurations of the subject for the target stream and (2) synthesized speech sound of new speech of the subject for the target stream, wherein for synthesizing images of new facial configurations, the model uses the trajectory of parameters to smoothly morph between a subset of images of the certain facial configurations of the video recorded data, the synthesis module rendering audio-video images and speech sound from the synthesized images of new facial configurations of the subject and the target stream, such that a videorealistic audio-visual animation of the subject is produced;
   the mouth parameters include a mouth shape parameter $\alpha$ and a mouth appearance parameter $\beta$; and
   the model building mechanism forms the multidimensional model by:

for each image of a subset of images from the image data of the video recorded data, computing optical flow vectors C from the image to every other image in the subset;

computing a mouth shape parameter value $\alpha$ and a mouth appearance parameter value $\beta$ for each image of the subset; and based on the computed mouth shape parameter $\alpha$ values and the computed mouth appearance parameter $\beta$ values, forming Gaussian clusters for respective phonemes, each Gaussian cluster having a means $\mu$ and diagonal covariance $\Sigma$ for mathematically representing the respective phoneme, such that (i) given a target set of $\alpha,\beta$ values, the model produces a morph image of the subject having a mouth with a mouth shape and mouth appearance configuration corresponding to the target $\alpha,\beta$ values, and (ii) given a target mouth image, the model computes $\alpha,\beta$ values that represent the target mouth image with respect to the images in the subset.

* * * * *